US010505917B2

(12) United States Patent
 Chhabra

(10) Patent No.: US 10,505,917 B2
(45) Date of Patent: Dec. 10, 2019

(54) SECURE DEVICE-TO-DEVICE PROCESS FOR GRANTING ACCESS TO A PHYSICAL SPACE

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 15/614,350

(22) Filed: Jun. 5, 2017

(65) Prior Publication Data

US 2018/0351941 A1  Dec. 6, 2018

(51) Int. Cl.
 *H04L 29/06* (2006.01)
 *H04L 9/32* (2006.01)
 (Continued)

(52) U.S. Cl.
 CPC .......... *H04L 63/0823* (2013.01); *G06F 21/44* (2013.01); *G07C 9/00309* (2013.01);
 (Continued)

(58) Field of Classification Search
 CPC ............ G07C 9/00126; G07C 9/00134; G07C 9/00174; G07C 9/00309
 See application file for complete search history.

(56) References Cited

U.S. PATENT DOCUMENTS 9,654,968 B2  5/2017 Peeters et al.
10,210,333 B2 * 2/2019 Smith, II ............ H04L 63/1441
 (Continued)

FOREIGN PATENT DOCUMENTS

WO  03088166 A2  10/2003
WO  2016048177 A1  3/2016

OTHER PUBLICATIONS

International Search Report and Written Opinion dated Aug. 21, 2018, International Patent Application No. PCT/US2018/034701, filed May 25, 2018.
 (Continued)

*Primary Examiner* — Lynn D Feild
*Assistant Examiner* — Richard A McCoy
(74) *Attorney, Agent, or Firm* — Davis Wright Tremaine LLP

(57) ABSTRACT

An unmanned vehicle may be utilized to perform various tasks, such as delivering packages and picking up packages for delivery in coordination with a physical access control device. Authentication and authorization processes may be used to grant the unmanned vehicle access to a physical space controlled by a physical access control device. A subsystem of the unmanned vehicle and the physical access control device may both support execution of computer instructions in a protected execution environment. A protected execution environment may be configured to provide an attestation to a remote counterparty, receive a purported attestation associated with the counterparty, verify the purported attestation is authentic using a root of trust in common with the remote counterparty, and perform authentication and authorization routines in connection with access policies of the unmanned vehicle, the physical access control device, or both.

20 Claims, 9 Drawing Sheets

(51) Int. Cl.
*G06F 21/44* (2013.01)
*G07C 9/00* (2006.01)
*H04L 9/08* (2006.01)
*H04L 9/38* (2006.01)
*G06F 21/00* (2013.01)

(52) U.S. Cl.
CPC ............ *H04L 9/088* (2013.01); *H04L 9/0877* (2013.01); *H04L 9/0897* (2013.01); *H04L 9/3234* (2013.01); *H04L 9/3265* (2013.01); *H04L 9/38* (2013.01); *H04L 63/061* (2013.01); *H04L 63/08* (2013.01); *H04L 63/166* (2013.01); *H04L 63/20* (2013.01); *G06F 21/00* (2013.01); *G07C 2009/00412* (2013.01); *G07C 2209/63* (2013.01); *H04L 2209/38* (2013.01)

(56) References Cited

U.S. PATENT DOCUMENTS

| | | | | |
|---|---|---|---|---|
| 10,286,558 | B1* | 5/2019 | Asada | B25J 11/008 |
| 2015/0072726 | A1* | 3/2015 | Stern | H04W 88/06 455/552.1 |
| 2015/0134968 | A1 | 5/2015 | Outwater et al. | |
| 2016/0033966 | A1* | 2/2016 | Farris | A47G 29/122 701/15 |
| 2016/0099814 | A1 | 4/2016 | Negi et al. | |
| 2016/0140496 | A1* | 5/2016 | Simms | G06Q 10/0835 705/337 |
| 2017/0161680 | A1* | 6/2017 | Hong | G06Q 30/06 |

OTHER PUBLICATIONS

Intel Corporation, "Intel Software Guard Extensions (Intel SGX)," Jun. 2015, 238 pages, Reference No. 332680-002, Revision No. 1.1.
Intel Corporation, "Overview of Intel SGX Enclave," [retrieved on Jun. 13, 2017], 12 pages, <https://drive.google.com/file/d/0B4N3YNdBPBe8MUNpMWNKVWdRaWM/view>.
ISO/IEC 11889-1:2009 Information technology—Trusted Platform Module—Part 1: Overview.
ISO/IEC 11889-2:2009 Information technology—Trusted Platform Module—Part 2: Design Principles.
ISO/IEC 11889-3:2009 Information technology—Trusted Platform Module—Part 3: Structures.
ISO/IEC 11889-4:2009 Information technology—Trusted Platform Module—Part 4: Commands.
Trusted Computing Group, "TPM Main, Part 1 Design Principles," Specification Version 1.2, Level 2 Revision 103, Jul. 9, 2007, 182 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Revision 116, Mar. 1, 2011, 339 pages.
Wikipedia, "IEEE 802.11," Wikipedia, the Free Encyclopedia, page last modified Feb. 7, 2017, retrieved =Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

\* cited by examiner

SECURE DEVICE-TO-DEVICE PROCESS FOR GRANTING ACCESS TO A PHYSICAL SPACE

BACKGROUND

Robots and other machines, such as an unmanned vehicle like an unmanned aerial vehicle (UAV) may be utilized to perform various tasks, such as delivering packages and picking up packages for delivery. Likewise, technological advancements have enabled computing devices to take various forms and perform various functions beyond those of traditional personal computers (PCs). As an example, a physical access control device may be utilized as a security system to obstruct access to a physical space such as a part of a residence, commercial space, warehouse, and more. In various cases, unmanned vehicles may seek to obtain access to physical spaces controlled by a physical access control device.

However, controlling access to a physical space presents many complex and difficult challenges. Verifying the identity of entities attempting to access is often difficult because an entity's credentials may be forged, fraudulent, or expired. Furthermore, various entities that seek access to a physical space may seek authorization to perform different types of tasks. Additionally, limiting the amount of information that an entity obtains from the physical access control device may improve security and privacy.

BRIEF DESCRIPTION OF THE DRAWINGS

Various techniques will be described with reference to the drawings, in which.

DETAILED DESCRIPTION

Figure 1:
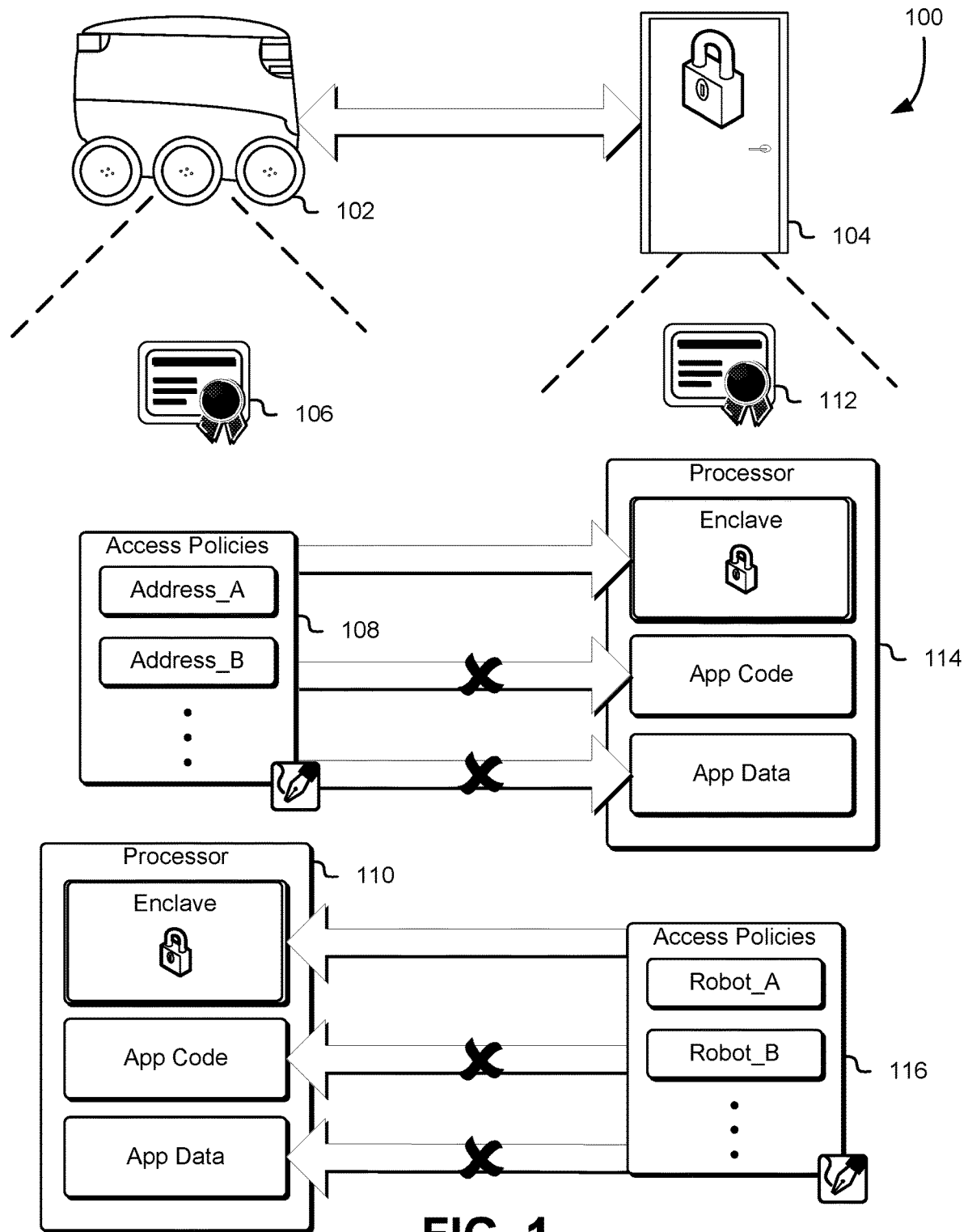
FIG. 1 illustrates an environment in which various embodiments can be implemented.

A robot or machine, such as an unmanned vehicle, is configured to receive, store, and/or generate a digital certificate which may include a public key associated with the unmanned vehicle which may be used as part of a TLS handshake process to establish a TLS session. In some embodiments, the vehicle's corresponding private key may be securely stored in a cryptographic module such as a hardware security module (HSM). The unmanned vehicle such as those described above in connection with may have an on-board computer system that supports a protected execution environment such as an enclave. A characteristic of enclaves is that application code and data within a protected execution environment (e.g., an enclave) are protected from entities outside the protected execution environment, even components with higher security privileges or the operating system itself. An unmanned vehicle may be an unmanned aerial vehicle such as those described below in connection with FIG. 3.

Similarly, a physical access control device such as those described below in connection with FIG. 4 may have a processor that supports execution of instructions in an enclave as well as outside of a protected computing environment. More generally, processes running outside of the enclave may include other enclaves or processes running in an unprotected computing environment (e.g., outside of any enclave). Thus, if the enclave running on one or more cores of a processor of the physical access control device stores sensitive data, such as access policies that includes address or GPS coordinates of delivery locations received from the unmanned vehicle, other processes running on the physical access control device computer system—including processes with higher security privileges and even the operating system—may not have access to the sensitive data.

A process outside of an enclave may execute navigation instructions that direct an unmanned vehicle to a particular destination. The destination may be specified in access policies that the unmanned vehicle received from a computing resource service provider, such as in the manner described below in connection with FIG. 2. The unmanned vehicle may propel itself to the destination, in some cases in conjunction with other mode of transportation—for example, an unmanned vehicle may be carried in a larger vessel for a portion of the journey to a destination and then complete the rest of the destination on its own. Such an example may arise where a truck or carrier drone is used to transport multiple unmanned vehicles to a neighborhood and dispatches the multiple unmanned vehicles to make multiple deliveries in parallel. The process operating outside of the protected execution environment may detect proximity to a physical access control device, for example, using a two-step process where the unmanned vehicle activates a secondary sensor after using a first sensor (e.g., a GPS receiver) to determine that communication with a particular physical access control device should be possible using short-range communication. A secondary sensor may be activated upon reaching a predetermined location (e.g., encoded as a street address or GPS coordinates) and the sensor may be used to detect whether communication with the physical access control device is possible. Short-range communication channels such as WiFi, Bluetooth, and the like may be used to establish a communication session between the unmanned vehicle and the physical access control device.

Upon detecting proximity to the physical access control device, such as by sending a message to a physical access control device and receiving a response, the unmanned vehicle may execute authentication and authorization processes in an enclave. In some embodiments, a negotiation agent running within an enclave may provide a remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data. In some embodiments, one or more of the resident cryptographic keys within the enclave of a processor may be shared in common with enclaves of another processor. In some embodiments, the cryptographic keys resident within enclaves may be stored and/or accessible by other processors that are manufactured by the same entity, organization, joint initiative, or consortium. For example, one or more cryptographic key that are used to digitally sign and/or encrypt data output from the enclave of the unmanned vehicle may also be accessible from within the enclave of the physical access control device (e.g., the enclave of the physical access control device has a copy of the cryptographic key that that the enclave of the unmanned vehicle uses to digitally sign and/or encrypt the data output).

The physical access control device may receive the remote attestation from the enclave of the unmanned vehicle—for example, the remote attestation may be encrypted and/or digitally signed using the cryptographic key resident within the enclave and transmitted to the physical access control device. The physical access control device may, in a similar manner, utilize a network interface to receive an encrypted and/or digitally signed remote attestation and, within the enclave of the physical access control device, verify the remote attestation by using its resident cryptographic key to decrypt an encrypted attestation and verify the decrypted contents, verify a digital signature by generating a digital signature over the received message and determining the generated and received digital signatures match, and more. As part of a mutual authentication process, the physical access control device may provide a remote attestation to unmanned vehicle in the same or substantially similar manner described above such that the unmanned vehicle's enclave can verify the characteristics of the enclave.

After one or more mutual attestations are provided (e.g., by the enclave of the unmanned vehicle to the enclave of the physical access control device or vice versa), the enclave of the unmanned vehicle and the enclave of the physical access control device may exchange cryptographic public keys. The public keys may be exchanged as part of a handshake process to establish a cryptographically protected communication session, such as a transport layer security (TLS) handshake. The cryptographic public keys may be in accordance with various asymmetric cryptography algorithms such as: RSA; digital signature algorithm (DSA); elliptic curve Diffie-Hellman (ECDH); elliptic curve digital signature algorithm (ECDSA); Diffie-Hellman (DH); and more.

After establishing a cryptographically protected communication session, the parties may exchange access policies such as those described above in connection with FIGS. 1 and 2. For example, the enclave of the unmanned vehicle may provide to the enclave of the physical access control device an access policy that includes a list of street addresses or GPS coordinates that the unmanned vehicle is performing deliveries for. Conversely, the enclave of the physical access control device may provide to the enclave of the unmanned vehicle a list of computing entities that it expects to receive deliveries from. The access policies may, as discussed above, include expirations, associated tasks, conditions of entries, and more. In some embodiments, it may be the case that one or both parties does not have and/or transmit policies to the counterparty. In some cases, the access policies are digitally signed such that the counterparty may verify authenticity of the access policies using cryptographic algorithms, such as in the manner described elsewhere in this disclosure.

Upon receiving one or more access policies, the enclave of the unmanned vehicle may verify both the digital signature associated with the received access policies and the contents of the received access policies. In some embodiments, verifying the contents of the received access policies may include determining that the access policies that the physical access control device grants the unmanned vehicle are sufficient for performing a particular task such as delivery of a package or pickup of a package. Likewise, enclave of the physical access control device may verify both the digital signature associated with the received access policies and contents of the received access policies. For example, the enclave of the physical access control device may verify that the access policies it received from the unmanned vehicle have not expired and that the task that the unmanned vehicle is performing is permitted. From a process running in an unprotected execution space, access may be granted, such as by opening or unlocking a door, removing a physical barrier, and so more. An indication that access has been granted may be provided to the enclave of the physical access control device which may also be provided to the enclave of the unmanned vehicle, for example, over a cryptographically protected communication session.

The enclave of the unmanned vehicle receives an indication that access has been granted. The indication may be made via a cryptographically protected communication session. In response to receiving the indication that access has been granted, the unmanned vehicle may perform a task such as delivering a package that may be done at least in part in by executing instructions from an unprotected execution environment.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, the environment 100 includes an unmanned vehicle 102 (e.g., an unmanned aerial vehicle or ground-based vehicle) and a physical access control device 104 that controls access to a physical space such as a warehouse, distribution center, factory, office space, residence, and more. In various embodiments the unmanned vehicle and the physical access control device may perform an authentication and/or authorization process in which the physical access control device grants the unmanned vehicle access to the physical space.

In some embodiments, the unmanned vehicle 102 is an unmanned aerial vehicle (e.g., an aerial drone). Other examples of unmanned vehicles may include autonomous cars, unmanned ground vehicles (e.g., vehicles that operate on the ground using wheels, tracks, trades, or other types of vehicle propulsion), and unmanned vehicles operating on and/or under a body of water. Further examples include biped robots (e.g., ASIMO created by Honda®) and quadruped robots (e.g. BigDog created by Boston Dynamics®) and, more generally, any type of robot having a propulsion and/or movement mechanism. An unmanned vehicle 102 may include various components, modules, subsystems, etc., such as a propulsion and/or movement system; a payload management subsystem; one or more sensors; a computer processor; a storage subsystem; and a cryptographic module. The unmanned vehicle 102 may be in accordance with those described elsewhere in this disclosure, such as in connection with FIG. 3.

In some embodiments, the unmanned vehicle is configured to receive, store, and/or generate a digital certificate 106. In some embodiments, the digital certificate 106 includes a public key associated with the unmanned vehicle 102. The digital certificate 106 may be an end-entity certificate. An end-entity certificate may refer to a certificate that includes a public key that has a corresponding private key which is used as part of a cryptographically protected communication. For example, in FIG. 1, the digital certificate 106, which may include information regarding a public key associated with the unmanned vehicle 102, may have a corresponding private key that the unmanned vehicle 102 has access to and may use as part of a TLS handshake process to establish a TLS session. In some embodiments, the vehicle's corresponding private key may be securely stored in a cryptographic module such as a hardware security module (HSM)—secure storage in this context may refer to the cryptographic keys being programmatically unexportable from the security module. The public and private keys discussed in connection with the digital certificate may be in accordance with various asymmetric cryptography algorithms such as: RSA; digital signature algorithm (DSA); elliptic curve Diffie-Hellman (ECDH); elliptic curve digital signature algorithm (ECDSA); Diffie-Hellman (DH); and more. The digital signature 104 may be used as part of a key exchange process between the unmanned vehicle 102 and the physical access control device 104.

In some embodiments, the digital certificate 106 may be issued directly or indirectly by a trusted root authority. For example, an intermediate authority's private key may be used to digitally sign the digital certificate 106 associated with the unmanned vehicle 102, and a private key associated with a root authority may be used to digitally sign an intermediate certificate that includes an intermediate authority public key corresponding to the intermediate authority private key used to sign the digital certificate 106. A root certificate may be a digital certificate that is self-issued by a trusted certificate authority. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provisioned by the organization but not necessarily trusted by device that have not been provisioned by the organization. A private key associated with the root authority identified in the root certificate may be used to digitally sign the intermediate certificate, and the public key included in the root certificate may be used to cryptographically verify the authenticity of the digital signature generated over the intermediate certificate. In other cases, the digital certificate 106 may be issued directly by the trusted root authority using its private key to digitally sign the digital certificate 106. In some embodiments, the digital certificate 106 associated with the unmanned vehicle 102 and the digital certificate 112 associated with the physical access control device 104 may both have a chain of trust to the same root authority (e.g., both digital certificates have a chain of trust to the same root certificate).

A valid chain of trust may exist from the digital certificate 106 to a root certificate and the validity of the chain may be cryptographically verified. A verification of the chain of trust may include obtaining an end-entity certificate (e.g., the digital certificate 106) and verifying the digital signature of the end-entity certificate using the public key of the issuer of the end-entity certificate (e.g., an intermediate certificate, as discussed above). In turn, the issuer certificate (e.g., the intermediate certificate) may be obtained and the digital signature of the issuer certificate may be verified in the same manner as just described. This process may be repeated until a certificate signed by a root authority (e.g., a root certificate, as discussed above) is obtained. The root authority certificate may act as the trust anchor for the certificate chain. The digital signature of the root certificate may be verified using the public key contained within the root certificate, and a verification may be performed to check that the root certificate is included in a list of trusted root certificates (e.g., a list of trusted certificates that is provisioned at least in part by a system administrator).

In some embodiments, the unmanned vehicle 102 has a set of access policies 108. The access policies 108 may encode policies that are associated with various entities such as the physical access control device 104 shown in FIG. 1, other physical access control devices, as well as other computing devices in general. For example, the access policies 108 may store a list of addresses, GPS coordinates, or other geolocation information for a list of destinations. In some embodiments, additional metadata is associated with each access policy, such as a time or range of times that the policy is valid, an associated task (e.g., delivery or pickup), and more. Policies may also include an expiration time, after which the entire access policy is invalid. In some embodiments, an unmanned vehicle may be provisioned with a set of access policies 108 and a payload of packages for delivery to at least some of the destinations listed in the access policies. The unmanned vehicle 102 may obtain geolocation information for a first destination from the access policies, use the geolocation information to navigate to the first destination, and deliver a package from the destination and/or pick up a package from the destination according to the policy. In some embodiments, access to the destination may include gaining access to a physical space from a physical access control device such as the physical access control device described in connection with FIG. 1. For example, the physical access control device 104 may control a gate or other physical barrier that obstructs access to the destination. Generally speaking, an unmanned vehicle 102 may be configured with one or more access policies, each encoding one or more policies.

In some embodiments, the access policies 108 are digitally signed using a cryptographic private key of an entity that is trusted by the physical access control device 104 such as a computing resource service provider or manufacturer that provisioned the physical access control device 104 with a trusted root certificate corresponding to that entity. The physical access control device 104 may receive the access policies 108 and the digital signature and use the public key included in the digital certificate to generate a digital signature over the access policies 108 and verify that the generated and received digital signatures match. While an asymmetric signature scheme may be utilized in the manner described above, such is not required—for example, a message authentication code (MAC) tag can be generated over the access policies 108 using a symmetric cryptographic key that is shared between the unmanned vehicle 102 and the physical access control device 104. Authenticity of the MAC tag is cryptographically verifiable by entities having access to the symmetric cryptographic key and the message. Accordingly, the physical access control device 104 may receive the access policies 108 and the MAC tag, use the symmetric cryptographic key to generate a MAC tag over the received access policies 108 and verify that the generated MAC tag and the received MAC tag match. If the MAC tags match, the physical access control device 104 may determine that there is a cryptographic assurance that the contents of the received access policy 108 are authentic. In some embodiments, the access policies 108 are used as part of an authorization process where the physical access control device 104 grants the unmanned vehicle 102 access to a physical space.

The unmanned vehicle 102 may include an on-board computer system that includes one or more processors such as the processor 110 shown in FIG. 1. The processor may be in accordance with those described elsewhere in this disclosure, such as in connection with FIG. 5. The processor 110 may support enclave capabilities. In some embodiments, access policies from the physical access control device 104 may be transmitted to a negotiation agent running in an enclave of the unmanned vehicle's processor 110, such as in the manner described elsewhere in connection with FIG. 6. Additionally, the access policies 116 of the physical access control device 104 may be sensitive information that is not accessible by application code (e.g., programs) and application data outside of the enclave or protected execution environment.

In some embodiments, a physical access control device 104 controls or partially controls access to a physical space. Access to a physical space may be controlled by a physical access device such as a wall, gate, barrier, fence, door, and other physical impediments that may be made impossible or impractical to gain access to a particular physical space. For example, a physical access control device 104 may be a device that locks and unlocks a door, opens or closes a gate, raises or lowers a wall, and more. Physical access to a space may be denied in various ways, such as locking a door, closing a door, or raising a wall. In some embodiments, the physical access control device may include a computer subsystem that may be used to store cryptographic information such as cryptographic keys, and may also be used to perform authentication and authorization procedures. The physical access control device 104 may be in accordance with those described elsewhere in this disclosure, such as in connection with FIG. 3.

The physical access control device 104 may be configured to receive, store, and/or generate a digital certificate 112. In some embodiments, the digital certificate 112 includes a public key associated with the physical access control device 104. The digital certificate 112 may be an end-entity certificate, and the physical access control device 104 may securely store (e.g., in a cryptographic module) the cryptographic private key corresponding to the public key associated with the physical access control device 104 encoded in the digital certificate 112. In some embodiments, the digital certificate 112 associated with the physical access control device 104 may be issued by the same trusted root authority that issued the digital certificate 106 associated with the unmanned vehicle 102. In some embodiments, the digital certificates are generated by a manufacturer or organization that owns the respective devices.

The physical access control device 104 may include one or more processors such as the processor 114 shown in FIG. 1. The processor may be in accordance with those described elsewhere in this disclosure, such as in connection with FIG. 5. The processor 114 may support enclave capabilities. In some embodiments, access policies from the unmanned vehicle 102 may be transmitted to a negotiation agent running in an enclave of the physical access control device's processor 114, such as in the manner described elsewhere in connection with FIG. 6. Additionally, the access policies 108 of the unmanned vehicle 102 may be sensitive information that is not accessible by application code (e.g., programs) and application data outside of the enclave or protected execution environment.

In some embodiments, the physical access control device 104 may have one or more access policies 116 that may correspond to one or more devices. The access policies 116 may be associated with devices that the physical access control device 104 grants access to and may be used as part of an authorization process. The access policies 116 may further specify rules or restrictions for the devices listed. For example, the access policies 116 may specify additional metadata for each device listed, such as a time or range of times that the policy is valid, an associated task (e.g., delivery or pickup), and more. In some embodiments, a digital signature or MAC tag is generated over the access policies 116 such that a recipient such as the unmanned vehicle 102 shown in FIG. 1 is able to cryptographically verify the contents of purportedly authentic access policies it receives are actually authentic. In some embodiments, the access policies 116 and a corresponding digital certificate or MAC tag may be transmitted from the physical access control device 104 to a protected execution environment running in a remote entity such as the enclave of the processor 110 shown in FIG. 1. In some embodiments, the data is communicated from the physical access control device's on-board protected execution environment (e.g., enclave of the processor 114) to a remote protected execution environment (e.g., enclave of the processor 110). Accordingly, data that is received by the enclave of the unmanned vehicle 102 may be inaccessible to other processes and routines running on the processor 110 including but not limited to application code and application data that may be running and/or stored on the processor 110 or any other logical and/or physical computing entity operating in conjunction with the processor 110 (e.g., RAM, memory caches, operating system, applications).

Figure 2:
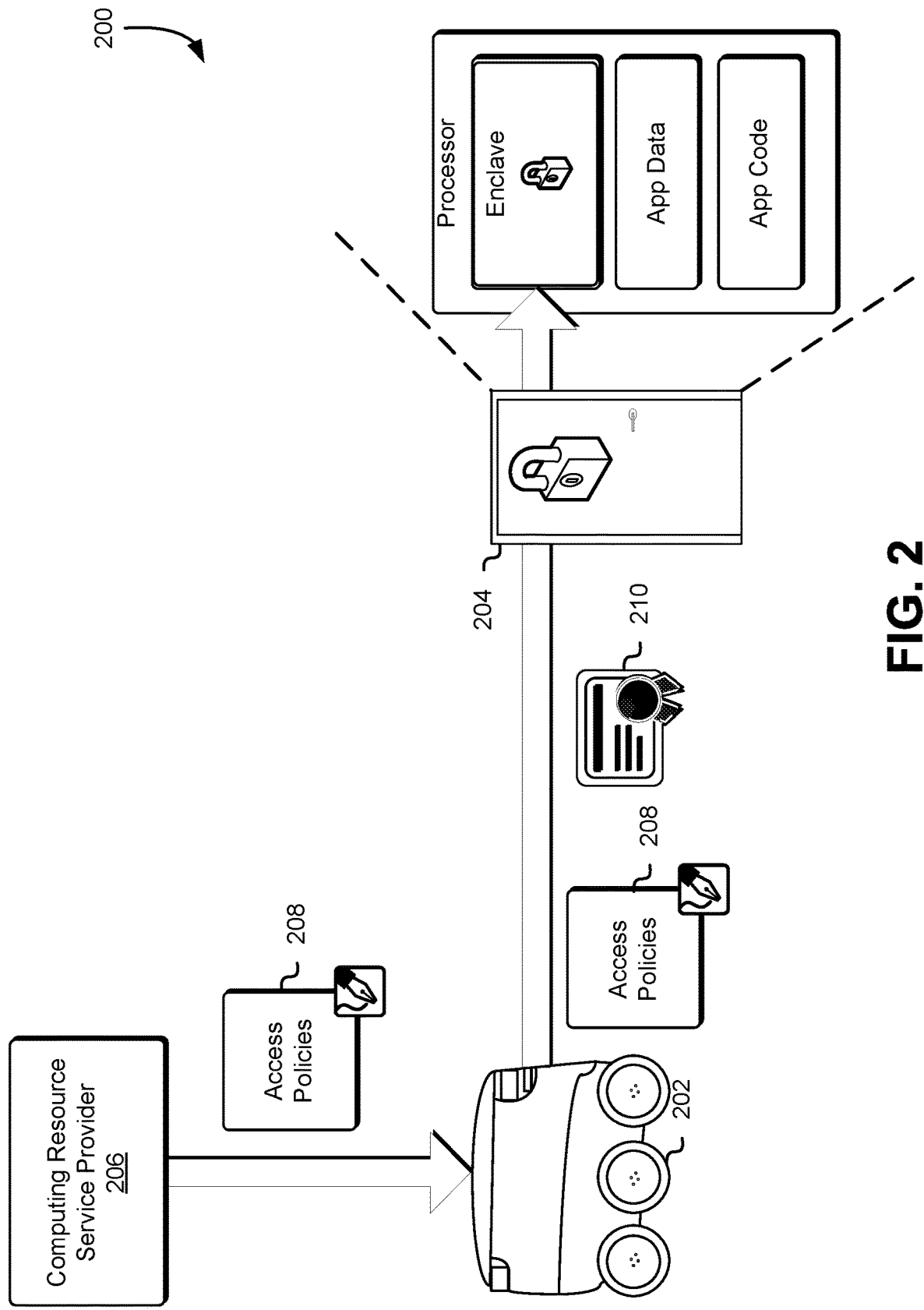
FIG. 2 illustrates an environment in which a computing resource service provide may be utilized as part of various embodiments.

FIG. 2 is an illustrative example of an environment 200 in which various embodiments of the present disclosure can be practiced. In an embodiment, the environment 200 includes an unmanned vehicle 202 (e.g., an unmanned aerial vehicle); a physical access control device 204; and a computing resource service provider 206. In various embodiments the computing resource service provider is utilized to control and/or provide instructions to the unmanned vehicle 202 to perform various tasks such as delivering and/or picking up a package from a location.

In some embodiments, the computing resource service provider 206 may be a service provider that includes, among other services, services related to identity and account management. A computing resource service provider 206 may also be configured with a policy management subsystem that may be used to generate access policies 208 such as those described elsewhere in connection with FIG. 1. The computing resource service provider 206 may be managed by an entity or organization that also has control over and/or manages the unmanned vehicle 202. For example, the computing resource service provider 206 may, in coordination with an order fulfillment system (e.g., a system that coordinates the delivery of products ordered remotely, such as through an online shopping website) receive a list of packages (e.g., a payload) and a corresponding list of locations (e.g., GPS coordinates, addresses) to deliver the packages to. Additional information may also be received, such as a routing information as to how the deliveries should be performed (e.g., sequence), a time range in which the deliveries should be made, and more.

The computing resource service provider 206 may encode some or all of the delivery information in an access policy 208 and generate a digital certificate by digitally signing the access policy. The unmanned vehicle 202 and/or the physical access control device 204 may have access to a public key that may be used to cryptographically verify the authenticity of the digital certificate. The unmanned vehicle 202 may receive, from the computing resource service provider, the access policies 208 and the corresponding digital certificate, verify that the authenticity of the digital certificate using a public key, and upon verifying that the digital certificate is authentic, use the access policies. For example, the unmanned vehicle 202 may travel to an address or GPS coordinate indicated as a delivery location in the access policies 208 and perform an authentication and authorization process with the physical access control device 204 which is indicated to be at that location. In some embodiments, the authentication process may include both the unmanned vehicle 202 and the physical access control device 204 providing remote attestations of a protected execution environment. The authentication process may further involve a mutual authentication process in which both the unmanned vehicle 202 and the physical access control device 204 authenticate the counterparty's identity concurrently. As part of the mutual authentication process, the unmanned vehicle 202 may provide a digital certificate 210 including its public key which has a chain of trust to a root authority that is trusted by the physical access control device 204. The authentication and authorization processes may be in accordance with those described elsewhere, such as in connection with FIGS. 6-8.

Continuing with the example, the unmanned vehicle 202 and physical access control device 204 may successfully perform authentication and authorization processes, and the physical access control device 204 may then grant access to a physical space to the unmanned vehicle 202. For example, the physical access control device 204 may unlock a door, open a gate, identify a drop-off location, and more. The unmanned vehicle 202 may, upon receiving access, deliver the package specified in an access policy, confirm the delivery of the package, and perform a second delivery to a second location specified in the access policies. The unmanned vehicle 202 may perform a second delivery at the second location with a second physical access control device that is the same or substantially similar to the first, and so on, until each package is delivered. Upon completion of all deliveries by the unmanned vehicle 202, the access policies may be removed from the device. Removal of the access policies from the device may be performed as a precautionary measure to ensure that information in the access policies is not obtained by a malicious party, for example, through hacking attempts. Thus, even in the unlikely event that a malicious party is able to intercept the unmanned vehicle at any point after the access policies have been deleted, information that may be sensitive to customers may not be improperly accessed. The unmanned vehicle 202 may, after completing or attempting to complete all deliveries in the access policies return to a warehouse and receive a second set of deliveries to perform from a second set of security policies and repeat the process as described above.

Figure 3:
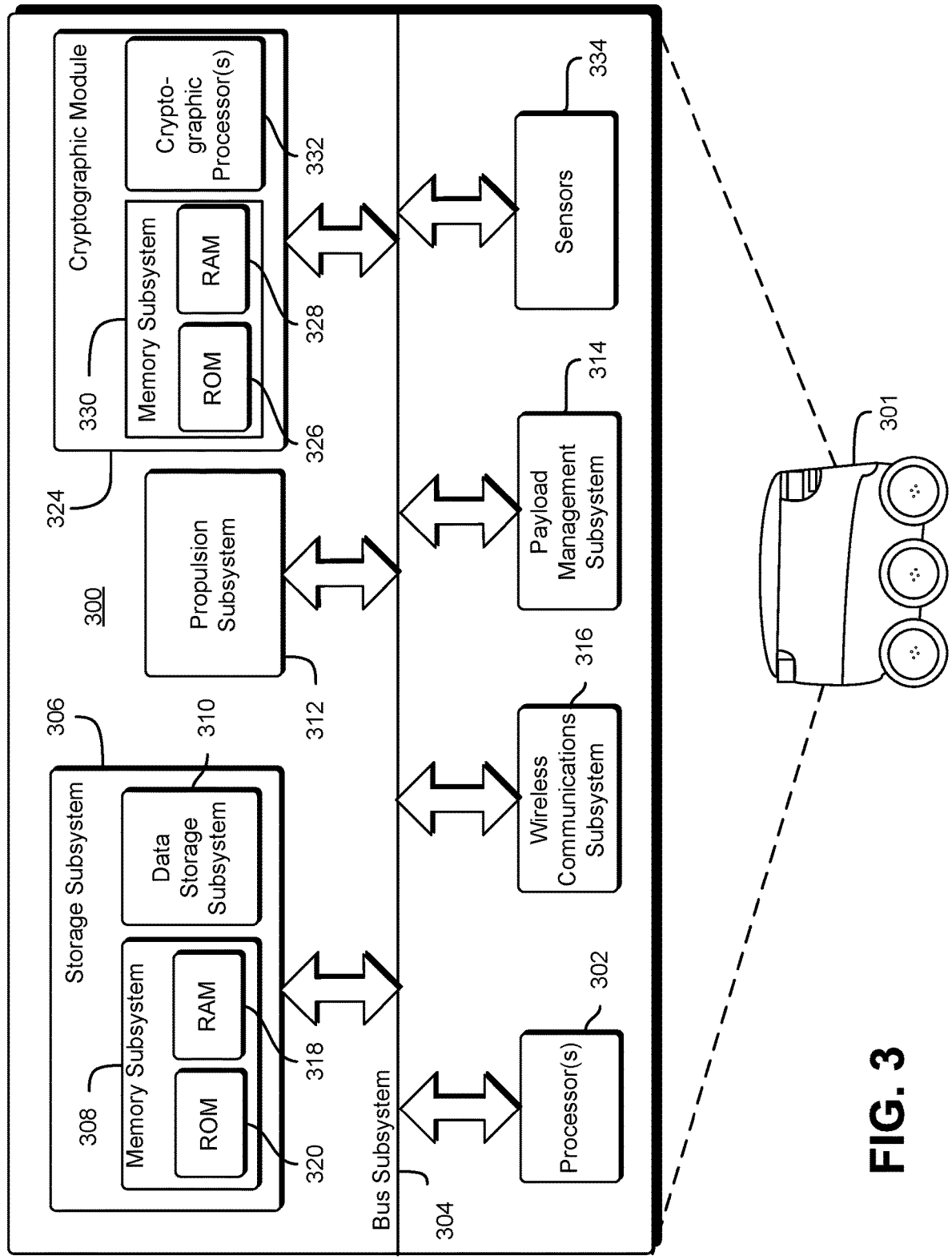
FIG. 3 shows an illustrative example of an unmanned vehicle such as a drone.

FIG. 3 is an illustrative, simplified block diagram of an example on-board computer system 300 of an unmanned vehicle 301 that may be used to practice at least one embodiment of the present disclosure. In various embodiments, the computer system 300 may be used to implement any of the systems illustrated herein and described above. As shown in FIG. 3, the on-board computer system 300 may include one or more processors 302 that may be configured to communicate with and are operatively coupled to a number of peripheral subsystems via a bus subsystem 304. These peripheral subsystems may include a storage subsystem 306, comprising a memory subsystem 308 and a data storage subsystem 310, a propulsion subsystem 312, a payload management subsystem 314, a wireless communication subsystem 316, a cryptographic module 324, comprising a memory subsystem 330, and one or more cryptographic processors 332, and a set of sensors 334.

The bus subsystem 304 may provide a mechanism for enabling the various components and subsystems of computer system 300 to communicate with each other as intended. Although the bus subsystem 304 is shown schematically as a single bus, alternative embodiments of the bus subsystem may utilize multiple buses.

The wireless communications subsystem 316 may provide an interface to other computer systems and networks. The wireless communications subsystem 316 may serve as an interface for receiving data from and transmitting data to other systems from the computer system 300. For example, the network interface subsystem 316 may enable transtask of messages and other related information (e.g., digital signatures), such as messages indicating weather, hazards, commands, and/or other messages described herein. In an embodiment, the wireless communications subsystem 316 uses the long-term evolution (LTE) standard to communicate with other wireless communications subsystems of other unmanned vehicles, although the scope of the present disclosure includes wireless communications using any suitable standard and/or protocol. In some examples, the wireless communications subsystem 316 communicates using the carrier sense multiple access with collision avoidance (CSMA/CA) protocol or another suitable protocol. The wireless communications subsystem 316 may also facilitate the receipt and/or transtask of data on multiple networks, such as by transmitting some data directly to other unmanned vehicles and transmitting other data through a cellular network.

The propulsion subsystem 312 may include various components that propel the unmanned vehicle 301 and that control the propulsion of the unmanned vehicle. For example, the propulsion subsystem 312 may include a plurality of motors, each with a propeller, and a controller for the motors that controls the individual rotational velocity of each propeller so as to control the unmanned vehicle's speed, altitude, direction, pitch, roll, yaw, and, the flight dynamics of the unmanned vehicle. The propulsion subsystem 312 may control other components (e.g., rudders, flaps, and other components that may affect the aerodynamics of the unmanned vehicle) if the unmanned vehicle is so equipped. While FIG. 3 shows a helicopter-style unmanned vehicle, other unmanned vehicles, such as noted above and, generally, any unmanned vehicle configured to travel on land, on sea, in sea, through air, and/or in space is considered as within the scope of the present disclosure, and the specific mechanisms used for propulsion may vary in accordance with different embodiments.

The payload management subsystem 314 may be a set of components of the computer system 300 configured for the management of a payload of the unmanned vehicle 301. For example, the payload management subsystem 314 may control a cargo bay that opens and closes to drop a payload delivered by the unmanned vehicle 301. In some examples, an unmanned vehicle has multiple cargo bays that can be used to selectively deliver one of many payloads. Generally, the payload management subsystem 314 may control one or more electrical and/or mechanical systems that enable the unmanned vehicle to release a payload from the control of the unmanned vehicle. The payload management subsystem 314 may also include various mechanisms (e.g., hooks, magnets, claws, and the like) for retrieving payloads and loading into a cargo bay of the unmanned vehicle or otherwise for bringing a payload into the control of the unmanned vehicle. As such, the payload management subsystem 314 may include a controller for one or more mechanisms (e.g., actuators or latches) that are used to open and close any cargo bays of the unmanned vehicle or otherwise control one or more payloads. Generally, the payload management system may perform other functions dependent on the specific configuration of the unmanned vehicle 301. For example, the payload management subsystem may be configured to deliver payloads in other ways in addition to or instead of opening cargo bays (e.g., by lowering a payload by a cable). The payload management subsystem 314 may perform more advanced functions, such as shifting payloads to improve flight characteristics, picking up payloads, and, generally, performing other functions that the unmanned vehicle may be configured to perform.

The storage subsystem 306 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 306. These application modules or instructions may be executed by the one or more processors 302. The one or more processors 302 may support executing code and storing data in a protected execution environment, such as in the manner described elsewhere in this disclosure. The storage subsystem 306 may additionally provide a repository for storing data used in accordance with the present disclosure. The storage subsystem 306 may comprise a memory subsystem 308 and a data (e.g., file/disk) storage subsystem 310 (e.g., for storing messages received, logs, and/or other information).

The cryptographic module 324, which may be a trusted platform module (TPM), includes a memory subsystem 330, including a main random access memory (RAM) 328 for storage of instructions and data during program execution and a read-only memory (ROM) 326, in which fixed cryptographic information may be stored, such as a cryptographic key stored securely within the on-board computer system 300 so as to be non-exportable (i.e., inaccessible through any call to the cryptographic module 324). The cryptographic module 324, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 118813, which are incorporated herein by reference. The on-board computer system 300 may also store cryptographic keys in RAM 328 and/or processor registers for temporary cryptographic processing. The cryptographic information stored in memory may be used in combination with cryptographic information obtained via the network interface 316 and/or one or more of the user interface input devices 312. The one or more cryptographic processors may be used to perform cryptographic operations in the on-board computer system and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. The one or more cryptographic processors may further be configured to perform obfuscation and de-obfuscation algorithms described herein. Obfuscation and de-obfuscation algorithms may include various schemes for performing cryptographic operations on data including block ciphers, stream ciphers, and digital signature schemes. The cryptographic operations described herein may be implemented by software executing in the module, by hardware within the module, or a combination thereof. Symmetric key algorithms may include various schemes for performing cryptographic operations on data including block ciphers, stream ciphers and digital signature schemes. Example symmetric key algorithms include, but are not limited to: the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to algorithms that utilize: hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure.

As noted above, in various embodiments of the present disclosure, cryptographic material (i.e., secret(s) such as cryptographic keys) is securely stored within the cryptographic module 324. In some embodiments, the cryptographic module is implemented as or may contain a physically unclonable function (PUF), which is a function implemented in physical hardware to use one or more secrets that are based at least in part on physical characteristics of the PUF. As a result, any attempt to obtain a secret may require physical intrusion into the PUF and physical intrusion may alter the physical characteristics of the PUF, thereby destroying the secret. Example PUFs that may be used include PUFs using explicitly introduced randomness, optical PUFs, coating PUFs, PUFs using intrinsic randomness, delay PUFs, static random access memory (SRAM) PUFs, butterfly PUFs, bi-stable ring PUFs, magnetic PUFs, metal resistance PUFs and/or other devices whose physical characteristics encode information usable as or for a secret.

As illustrated in FIG. 3, the unmanned vehicle's on-board computer system 300 may include a set of sensors 314 that gather data utilized by the various components of the on-board computer system. For instance, the sensors 314 may include an altimeter that is used by the propulsion subsystem 312 for flying and related activities (e.g., taking off and landing). As another example, the sensors 314 may include a gyroscope that is used by the propulsion subsystem 312 to control pitch, roll, and/or yaw. An accelerometer may be used by the propulsion subsystem 312 as part of its avionics logic. A satellite-based navigation system sensor may be used by the propulsion subsystem 312 to control flight according to routes and also by other subsystems, such as by the one or more processors 302 for calculation of routes (e.g., by obtaining a current location and calculating an optimal route to a specified destination). For example, a global positioning system (GPS) receiver may be used by the propulsion subsystem 312 to determine the vehicle's geolocation, perform navigation functions, and more. Various types of global navigation satellite systems may be utilized by satellite-based navigation receivers, such as global positioning system (GPS, previously Naystar GPS), ГЛОбальная НАвигационная Спутниковая Система (GLONASS), Galileo, and BeiDou Navigation Satellite System (BDS). A compass may be used by the propulsion subsystem 312 to control direction. A set of proximity sensors (e.g., using acoustic proximity detectors) may be used by the propulsion subsystem 312 for the purpose of obstacle avoidance and accurate navigation (e.g., during a delivery). Some sensors may be used to gather environmental data, such as audio, video, digital images, and the like. Other environmental data may be related to the weather and, accordingly, the sensors 314 may include sensors that gather weather data, such as wind speed, barometric pressure, humidity, visibility, and the like. The sensors listed are examples and, generally, the specific sensors that are used on an unmanned vehicle may vary in accordance with the tasks that the unmanned vehicle performs.

Figure 4:
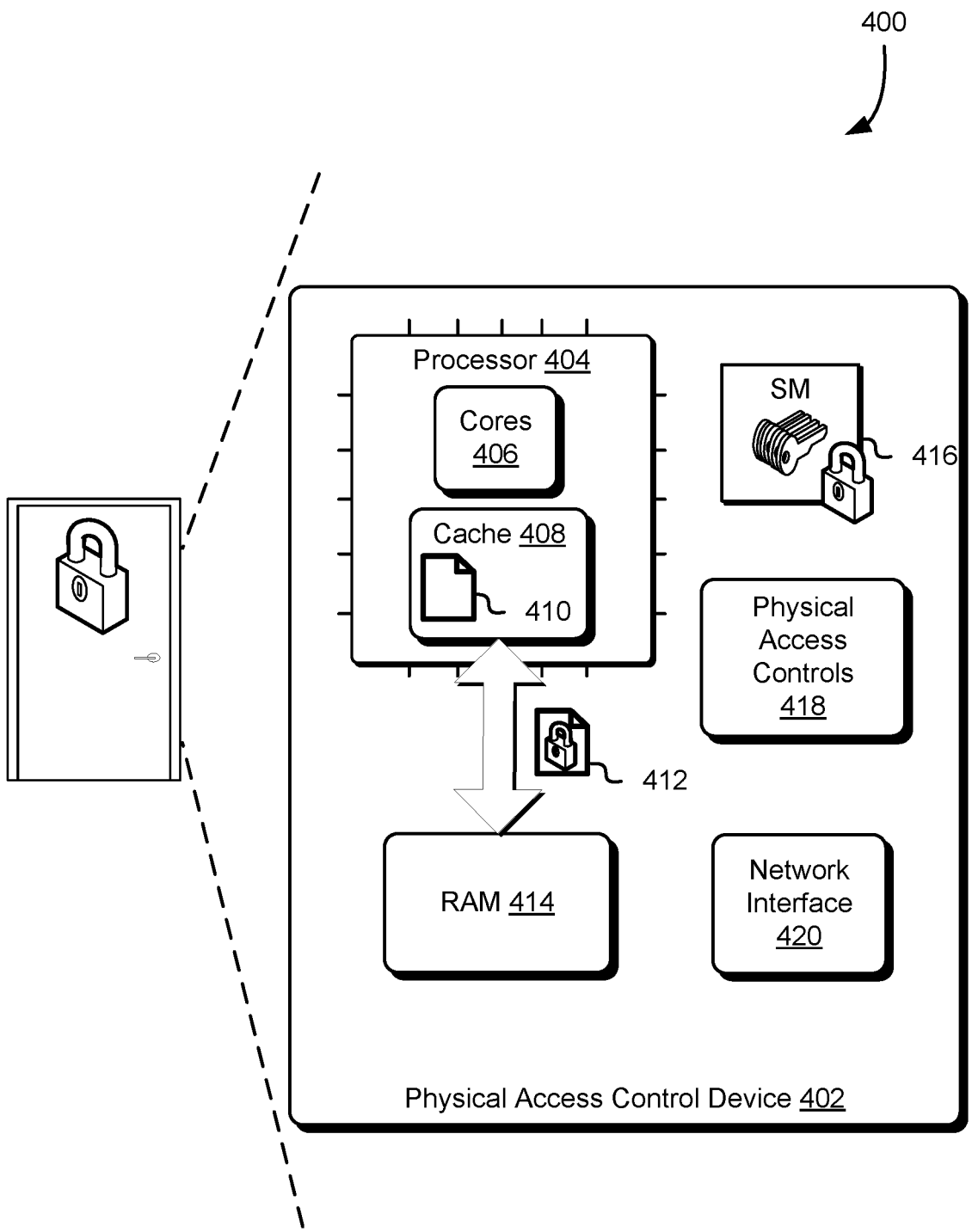
FIG. 4 shows an illustrative example of a physical access control device.

FIG. 4 is an illustrative, simplified block diagram 400 of an example physical access control device 402 which may be in accordance with physical access control devices described elsewhere, such as in connection with FIGS. 1 and 2. In various embodiments, the physical access control device may include a computer subsystem that includes various components such as a processor 404; RAM 414; a security module 416; one or more physical access controls 418; and a network interface 420.

A physical access control device 402 may have one or more processors 404 such as central processing units (CPUs) that may be configured to perform various operations. The physical access control device 402 may support a protected execution environment such that some or all code and data within the processor 402 boundary is cryptographically protected when it is exported beyond the boundary, such as through encryption. In some embodiments, the processor 404 may include one or more processor cores 406 on the same die such that at least some of the cores are capable of reading and executing instructions such as executable code. The processor may further include a processor cache 408 or CPU cache. The processor cache 408 may be an on-die cache such that the cache 408 is physically located on the same semiconductor wafer as one or more processor cores. The cache 408 may be a form of volatile memory that is utilized to store data and code (e.g., executable code). In some embodiments, the protected execution environment may be used to perform various operations that use sensitive data 410 such as credit card numbers, social security numbers, passwords, and the like. The sensitive data 410 may be utilized by processes running in the protected execution environment (e.g., a process for payment services that utilizes the credit card information to authorize a transaction). In some embodiments, a negotiation agent may be run or executed in the protected execution environment and may be used to perform authentication and authorization processes with another computing entity such as the unmanned vehicle described above in connection with FIGS. 1-3. Sensitive information 410 that is unexportable from a protected execution environment (e.g., information that is encrypted upon being exported) may include access policies such as those described above in connection with FIGS. 1 and 2.

A physical access control device 402 may be configured to have system memory such as RAM 414. Any suitable form of volatile memory may be used in place of and/or in addition to RAM, such as registers, caches, and other types of temporary storage. In some embodiments, the contents stored in volatile memory such as RAM 414 are erased as a result of the physical access control device 402 losing power (e.g., the device rebooting as a result of a loss of power, even temporary). Data stored in volatile memory may be maintained based at least in part on the device maintaining power—the data may be lost when the device loses power even, in some cases, as a result of temporary and/or intermittent power loss of the device. In some embodiments, a protected execution environment excludes at least a portion of system memory such as RAM. In various embodiments, the protected execution environment includes a processor (including one or more processor cores and one or more caches) such code and data being executed and/or stored in the protected execution environment is not accessible by the system memory. The sensitive data 410 may be utilized by processes running in the protected execution environment (e.g., a process for payment services that utilizes the credit card information to authorize a transaction). However, if the sensitive data 410 is exported from the protected execution environment, the sensitive data may be exported in an obfuscated format. For example, the sensitive data may be encrypted such that the sensitive data is in an encrypted format 412 when it is outside of the processor boundary. Generally speaking, when data and/or code is exported from a protected execution environment, it may be encrypted and/or integrity checked (e.g., by generating a MAC tag) using a cryptographic key that is inaccessible to components and processes outside of a predefined security boundary (e.g., the processor).

A physical access control device 402 may be configured with one or more security modules such as the security module 416 shown in FIG. 4. A security module may be a trusted platform module (TPM), physically unclonable function (PUF), hardware security module (HSM), and the like. In some embodiments, a security module is a physical computing device that safeguards cryptographic keys by storing them within a tamper-resistant physical device. Security modules may be used for cryptographic key generation and storage, and to perform cryptographic operations for authorized clients of the security module. In general, the cryptographic keys are not exportable from the security module in an unprotected form. A security module may be configured to perform various types of cryptographic operations such as encrypting data, decrypting data, verifying authenticity of data, and more. Encryption and decryption operations may be extended to support authenticated encryption and authenticated decryption, respectively. A security module that has been tampered with or been subject to an attempted tampering may be unable to perform cryptographic operations.

In some embodiments, the physical access control device 402 includes one or more physical access controls 418 which may be used to control or partially control access to a physical space. Access to a physical space may be controlled by walls, gates, barriers, fences, doors, and other physical impediments that may make it impossible or impractical to gain access to a particular physical space. For example, a physical access control device 402 may be a device that locks and unlocks a door, opens or closes a gate, raises or lowers a wall, and more. Physical access to a space may be denied in various ways, such as locking a door, closing a door, or raising a wall. The physical access controls 418 may be used to control motors, gates, latches, barriers, and the like, which may be used to grant access to a physical space.

A physical access control device 402 may further include a network interface 420. The network interface 420 may be used as an interface between the physical access control device 402 and an external device such as a computing resource service provider or a computing device (e.g., an unmanned vehicle). In some embodiments, the network interface is used to communicate with other computing devices in an ad-hoc manner—for example, in some embodiments, the physical access control device 402 and a computing device (e.g., unmanned vehicle) may communicate directly with each other and perform authentication and authorization processes even though such processes could be otherwise brokered using a trusted third party such as an identity access and management service of a computing resource service provider.

While various components of a physical access control device have been illustrated in FIG. 4, the physical access control device 402 may be configured with various components added, removed, modified, or some combination thereof. For example, a physical access control device may further include a satellite-based navigation sensor such as a global positioning system (GPS) receiver that may be used as part of determining a location.

Figure 5:
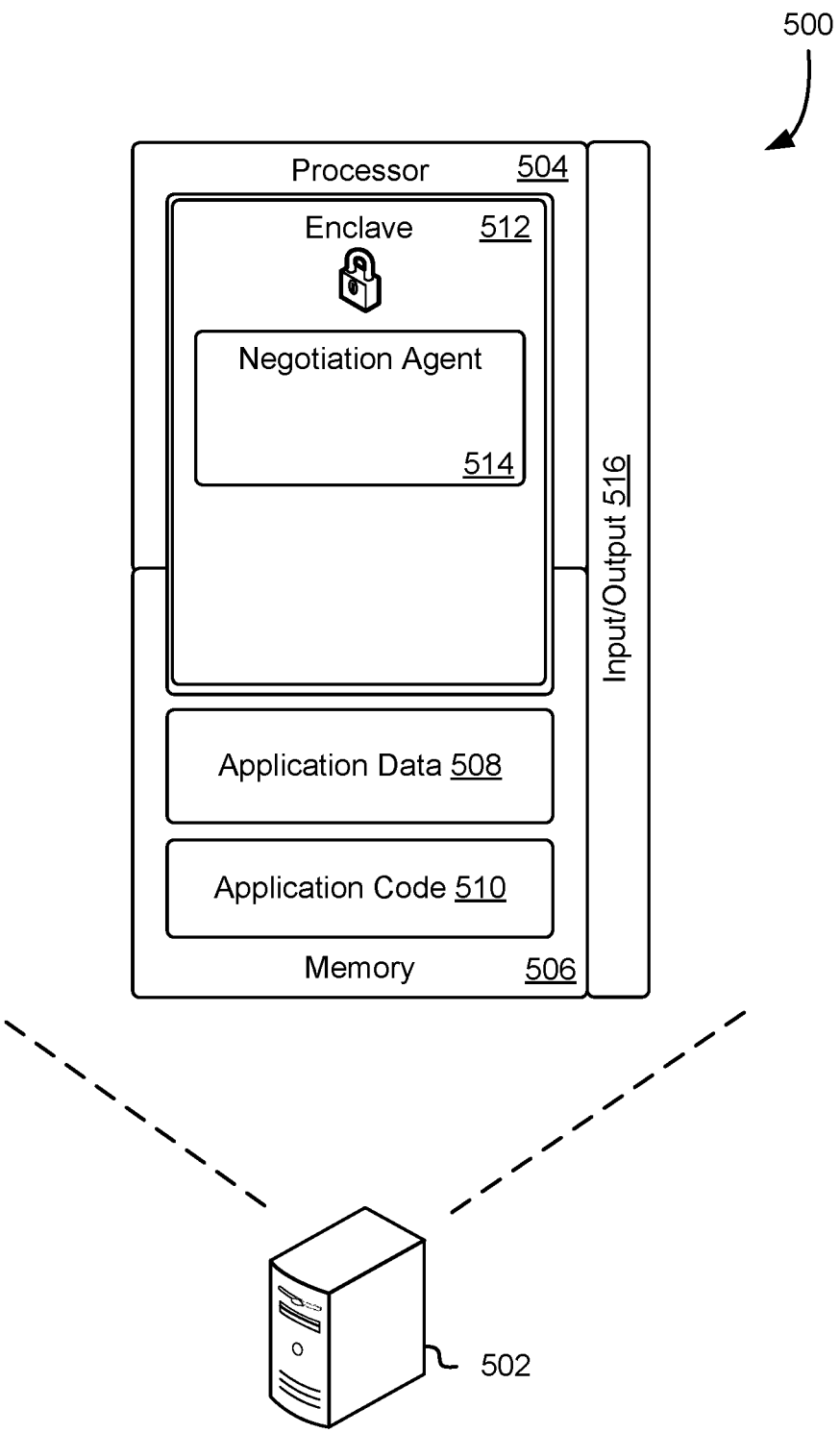
FIG. 5 shows an illustrative example of a computer system or computer subsystem that supports a protected execution environment such as an enclave.

FIG. 5 illustrates an aspect of an environment 500 in which various embodiments of the present disclosure may be practiced. As illustrated in FIG. 5, the environment 500 may include a computer system 502 having processors 504, memory 506 for execution and storage of applications and data 508 of a customer of a computing resource service provider. The processor 504 may support enclave functionality, such as support for Intel® Software Guard eXtensions (SGX), a module such as a trusted platform module (TPM), system microcode or combinations of these and/or other supported capabilities, for instantiating an enclave 512.

An enclave is a protected area in memory address space of a computer system that provides confidentiality and integrity for applications and data within the protected area. The enclave operates as a protected execution environment; that is, the enclave prevents applications external to the enclave, even privileged applications such as virtualization monitors, basic input/output systems, operating systems, and even other enclaves, from accessing the enclave memory address space, but applications executing within the enclave may access executable instructions and data internal to the enclave. The enclave prevents access to unencrypted enclave data (i.e., data resident within the enclave) by applications external to the enclave, and when the data is written to the memory address space, the data is automatically encrypted. Additionally, information exiting the enclave may be cleansed of data referring to the enclave's protected memory addresses to prevent external software from determining the location of enclave-protected data in memory.

Enclave functionality may be provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. Enclave functionality allows programmatic instantiation of an enclave, which may comprise initializing of an enclave control structure, allocating enclave memory, loading of enclave contents (e.g., applications and/or data loaded into the enclave) into the enclave memory, measuring of the enclave contents, and establishing an enclave identity. Enclave functionality may also include the ability to protect applications and/or data within the enclave from malicious software attacks, by detecting integrity violations of protected applications and/or data and preventing access to protected applications and/or data that fail integrity checks.

A characteristic of an enclave is an ability to provide remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data.

The enclave 512 of the present disclosure may further have a negotiation agent 514 in the form of executable code for performing authorization and authentication processes within the enclave 512. The negotiation agent 514 may be configured to perform various operations in connection with authentication and authorization processes. The computer system may further comprise an input/output 516 module for communicating with entities outside the host computer system through a virtual or physical network.

The processor 504 may include any suitable processing device capable of supporting enclaves, including processing devices based on Intel® Software Guard eXtensions. The memory 506 may include a number of types of memory, such as described below.

Application data 508 may include data structures, memory structures, and various other types of data that may be utilized in the course of the execution of application code 510. In general, an application may have instructions in the form of application code and data that is utilized in the execution of the instructions in the form of application data. In some cases, an enclave 512 may store application data within a protected execution environment so that the application data is not available to processes outside of the protected execution environment. As noted, the enclave 512 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. In this manner, a protected execution environment (e.g., an enclave) may be configured such that application data within the protected execution environment is protected from entities outside the protected execution environment.

Application code 510 may include computer executable instructions that may be executed on a computer system, including an operating system, system and hardware drivers, business applications, entertainment applications, web browsers, e-mail clients, and anti-virus and other anti-malware applications. In some cases, application code 510 may execute within an enclave 512. In some of those cases, the applications may execute in their own enclave. In some embodiments, such as that depicted in FIG. 5, the negotiation agent 514 may be instantiated within the enclave 512 on the computer system. As noted, the enclave 512 may be a protected execution environment provided by supporting hardware or software on the computer system such as by a specialized instruction set, such as Intel® Software Guard eXtensions (SGX), a module such as a trusted platform module (TPM), system microcode, a hypervisor configured to manage a virtualization of protected execution environments or combinations of these and/or other supported capabilities. One characteristic of a protected execution environment is the ability to provide remote attestation as to the state of the protected execution environment. For example, the protected execution environment may have a set of functions that, when executed by a processor, may provide a measurement indicating the current state of executable code and/or data within the enclave. Another characteristic of a protected execution environment is that it has a root of trust separate and protected from outside entities. That is an entity (e.g., an application running on a device operated by a user), may be configured to trust the protected execution environment because the protected execution environment may have cryptographic keys, such as a private key of a public-private key pair, not visible to outside entities, and outside entities can verify (i.e., trust) information coming from the protected execution environment because the information may be verified as digitally signed with the private key of the enclave. In this manner, a protected execution environment (e.g., an enclave) may be configured such that application code within the protected execution environment is protected from entities outside the protected execution environment.

The enclave 512 may be provided by selecting computer systems being configured to support the instantiation of enclaves and causing the enclave 512 to be instantiated. The computer systems may support the instantiation of enclaves based on the hardware capabilities of the system. For example, enclave functionality may be provided to a system by a specialized instruction set, such as Intel® Software Guard eXtensions, a module such as a trusted platform module, system microcode or combinations of these and/or other supported capabilities. As an example, the enclave 512 may be provided by selecting a computer system, such as from a web-based management console, from computer systems configured to support enclave functionality.

Enclave functionality may include functionality for creating, deprovisioning, measuring (i.e., gathering metrics from), and populating enclaves. Enclave functionality may further include generating keys and/or sending and receiving data. Access to such enclave functionality may be provided by a code library, an interface, web service, application programming interface (API), or other access methodology. In response to receiving a request through one of the methods of accessing enclave functionality, the computing resource service provider may provide that access to a user of a computer system. Note that the providers of enclave functionality, the types of enclave functionality, and the methods of providing access to enclave functionality described are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, instructions executed within the enclave 512 by a processor may generate a set of cryptographic keys for encrypting, decrypting, and performing integrity validation of data passing between the enclave 512 and another entity. In some cases, the set of cryptographic keys may be a key-pair based on an asymmetrical public-private cryptographic scheme, and instructions executed within the enclave 512 by a processor may provide the public key of the key-pair to a trusted entity and retain the private key of the key-pair securely within the enclave 512 where it may not be accessible to outside entities. Subsequently, the trusted entity may encrypt data and/or instructions using the public key and provide the encrypted data and/or instructions to the enclave 512, whereupon instructions executed within the enclave 512 by a processor may decrypt the data and/or instructions using the private key held within the enclave 512. Alternately or additionally, instructions executed within the enclave 512 by a processor may digitally sign results of processing or execution using the private key within the enclave 512 to provide assurance to the trusted entity that the output has not been tampered with or forged.

In other embodiments usable in combination with other embodiments, the trusted entity may generate a set of cryptographic keys for encrypting, decrypting, and performing integrity validation of data passing between the enclave 512 and another entity. In some cases, the set of cryptographic keys may be a key-pair based on an asymmetrical public-private cryptographic scheme, and the trusted entity may provide the public key of the key-pair to the enclave 512 and retain the private key of the key pair. Subsequently, instructions executed within the enclave 512 by a processor may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave 512 using the private key of the trusted entity to provide assurance to the enclave 512 that the data and/or instructions have not been tampered with or forged. Alternately or additionally, in a technique referred to as enveloping, instructions executed within the enclave 512 by a processor may provide the trusted entity with a session key encrypted using the public key of the trusted entity. Subsequently, instructions executed within the enclave 512 by a processor may provide encrypted data and/or results of processing of execution, whereupon the trusted entity may decrypt the encrypted data and/or results using the session key.

A computer system for hosting enclaves may be a distributed system with multiple hosts, may be a single system with virtual machine instances or may be a networked combination of such systems. A computer system may provide access to such as users, customers, modules, applications, services, processes, programs, operating systems, and controlling domains. Some of the access provided by the computer system to these entities may include providing access to confidential data and/or privileged applications. A computer system may also provide data storage regions to the customer, including memory, disk storage, virtual memory and virtual disk storage. Consequentially, some of the data storage regions provided by the computer system may be configured to store confidential and/or otherwise significant data.

A computer system for hosting enclaves may also run entities (e.g., applications, processes, services, modules, etc.) configured to access and/or manipulate such confidential data. A computer system may also run applications from a computing resource service provider that may utilize privileged code or perform operations on confidential data. Additionally, a computer system may include operating systems, privileged users, and controlling domains having full access to the computer system resources, such as direct access to the computer memory 506, processors, data storage, and the network. A customer may wish to secure confidential data, and any applications 510 configured to access such confidential data, by preventing access to the data and/or applications 510 by entities without proper credentials, even those entities that are typically trusted entities such as operating systems, privileged users, and controlling domains. Similarly, a computing resource service provider may also wish to secure such confidential data and any applications 510 configured to access the confidential data by preventing access to the confidential data and applications 510 by any entity without proper credentials.

A computer system of a computing resource service provider may be configured to support a virtualization layer to provide computational resources upon which virtual machines may operate. The virtualization layer may manage memory 506 and processor scheduling for all virtual machines operating on the computer system. The virtualization layer may also launch and/or manage a control domain, also known as a privileged domain, which is a virtual machine having direct access to the hardware of the computer system. The virtualization layer may be any device, software or firmware, used for providing a virtual computing platform for the virtual machines. The virtual machines of the virtualization layer may be provided to customers of the computing resource service provider, and the customers may run an operating system and/or applications on the virtual machines of the customer. An example of a virtualization layer includes a hypervisor.

An entity, such as a service or operating system running on the computer system, the controlling domain, a guest domain running a virtual machine instance, or a service or operating system of the controlling domain or a guest domain, may provide an interface to enclave functionality. An entity (e.g., a user operating a device running applications) with access to a virtual machine instance on the computer system may use that interface to the enclave functionality to, for example, create an enclave, populate the enclave, and/or obtain keys.

In an illustrative example, a computer system may provide enclave functionality, as noted, via the SGX instruction set that may be enabled on the CPU of the computer system, although the scope of the present disclosure extends to other enclaves. The physical hardware of the computer system may be any device or equipment configured to execute instructions for performing data computation, manipulation or storage tasks, such as a computer or server. The computer system may be equipped with processors 504, including a CPU, a graphics processing unit (GPU), and a digital signal processor (DSP). The computer system may further include memory 506, including static and dynamic volatile memory, and non-volatile persistent storage such as optical and magnetic storage disks, tape, and flash memory. The computer system may also include additional hardware such as buses, input/output modules, and networking equipment compliant with any handshaking, communications or data transfer protocol.

As noted, a host computer system may provide enclave functionality through instructions made to the processors 504 configured to support a protected execution environment, such as SGX, TPM or a hypervisor configured to support management of protected execution environments. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services, such as block-level data storage services, cryptography services, on-demand data storage services, archival storage services, notification services, authentication services, policy management services, billing services and task services, may also access the enclave functionality to provide that functionality to resources associated with those services. Enclave functionality may also be provided to customers of the computing resource service provider. For example, an entity with access to a service and/or access to the resources served by that service may use enclave functionality to further secure data and/or applications 510 associated with that service. In an illustrative example, a virtual computer system service and/or a virtual machine instance associated with that virtual computer system service may use the enclave functionality to create an enclave, populate the enclave with data and/or applications 510, obtain keys for decrypting results from the enclave, start the applications 510 within the enclave and receive updates.

The measurements may indicate a current state of the enclave 512 and/or contents within the enclave 512. The measurements may be evaluated within the enclave 512 or may be sent outside the enclave 512. Enclaves may be configured such that measurements are performed entirely within a secure portion of the processors 504 and may also be configured so that the measurements are signed by secret materials provided by the processors 504, such as, for example, microcode running on the processors 504 or a private key. In this way, measurements may be verified as correct by trusted users using the functionality provided with the enclave. Measurements may be verified by, for example, an application programming interface, which may provide information usable to determine the state of the processors 504.

The measurements may be based on measurements obtained from host computer system hardware, such as, for example, measurements obtained by utilizing SGX instructions supported by the processors 504 of the host computer system. In order to obtain the measurement, the enclave 512 may first need to be paused or frozen by halting the execution of applications 510 running within the enclave 512 and/or by placing the applications 510 in a certain determined state. By pausing and/or freezing the applications 510 and/or placing the applications 510 in a determined state, external verification that the enclave 512 and its contents have not been tampered with may be made by comparing the measurements with predicted values. Measurements may include, in some embodiments, verification and/or validation that the measurements were performed by a trusted, verified and/or validated source. For example, measurements performed by the processors 504 executing the appropriate SGX instructions may be digitally signed by the processors 504 and thereby verified as coming from the particular processors 504. Likewise, measurements coming from a TPM may include a similar verifiable signature with the measurements as an assurance that the measurements were performed by the TPM and/or a process running thereon.

In some embodiments, enclaves of a computing resource service provider may be configured with bootstrap code for instantiating other enclaves. In these embodiments, a request may be made to an application programming interface to an enclave 512 to instantiate additional enclaves on additional computer systems. An example of how this embodiment may be used may include providing a method by which a computing resource service provider to quickly provide enclaves to newly-created or re-booted host machines by submitting a request to the application programming interface to instantiate enclaves for newly-created or rebooted host machines.

Applications 510 and/or data installed in the enclave 512 may include applications to provide access to and/or process other types of confidential data. For example, a payment processing application running as a web service on a host computer of a computing resource service provider may be executed in the enclave 512 by first measuring the Application 510, encrypting the Application 510, injecting the Application 510 into the enclave 512, and finally decrypting and running the Application 510 within the enclave 512. Note that the methods of providing access to enclave functionality described are for illustrative purposes and, as such, other methods of providing access to enclave functionality as would be contemplated by a person having ordinary skill in the art may be considered as within the scope of the present disclosure.

In some embodiments, an input/output module includes any type of communication channel by which two or more devices may communicate, including physical network cables, wireless communications, universal serial bus (USB), serial, parallel, and other conduits. The network may be any suitable network, including the Internet, an intranet, wide area network (WAN), local area network (LAN), and direct connection. The network may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

In some embodiments, the enclave functionality may be provided as an application, process or module, and may, in some cases, be implemented as a single instance on a computer system providing enclave functionality for virtual machine instances. The application, process or module so configured may also operate on a remote machine and/or may provide enclave functionality in a distributed and/or hierarchical manner. Said application, process or module may further be configured to start automatically when a machine and/or virtual machine is started, or, alternately, may be started as needed (e.g., when a client entity requests access to the enclave functionality).

A computing resource service provider may provide a variety of services to its customers, and its customers may communicate with the computing resource service provider through an interface, which may be a web page or other type of customer interface. Each service of the services provided by the computing resource service provider may have its own interface and subsets of the services may have corresponding individual interfaces in addition to or as an alternative to a common interface. A customer may communicate with the computing resource service provider through a network, such as the Internet or intranet.

The computing resource service provider may also provide various computing resources and services to its customers, individually or in combination with other resources and services, and the computing resource service provider may further provide those services to the customer through a distributed computing environment. The services provided by the computing resource service provider may include services such as virtual computer system services, block-level data storage services, cryptography services, on-demand data storage services, notification services, authentication services, policy management services, task services and archival data storage services. Not all embodiments described include all the services described, and additional services may be provided in addition to or as an alternative to services explicitly described.

Services provided by a computing resource service provider may include interfaces that enable a customer to submit requests, for example, through appropriately configured API calls, to the various services. In addition, each of the services may include service interfaces that enable the services to communicate with or access each other (e.g., to enable a virtual computer system of the virtual computer system service to store data in or retrieve data from an on-demand data storage service and/or access block-level data storage devices provided by a block-level data storage service). Each of the service interfaces may also provide secured and/or protected access to each other through the use of encryption keys and/or other secured access methods, thereby enabling secure and/or protected access between them. Collections of services operating in concert on a distributed computer system may have a single front-end interface and/or multiple interfaces between the elements of the distributed computer system.

A computing resource service provider may provide a virtual computer system service that may be a collection of computer resources configured to instantiate virtual machine instances on behalf of the customer. The customer may interact with the virtual computer system service to provision, place and operate virtual machine instances that are instantiated on computer systems operated by the computing resource service provider. The virtual machine instance may be used for various purposes, such as to operate as servers supporting a web site, to operate business applications, or, generally, to provide compute power to the customer. Other applications for the virtual machine instances may be to support database applications, electronic commerce (e-commerce) applications, business applications and/or other applications.

A virtual computer system service may be used by a computing resource service provider for providing computer system resources for customers. The virtual computer system service may provide such computer system resources by instantiating virtual machine instances on physical hardware. The physical hardware may include physical hosts, which may include any device or equipment configured to execute instructions for performing data computation, manipulation or storage tasks, such as a computer or server. A physical host may be equipped with any needed processing capability including processors 104, such as a CPU, GPU, DSP, memory, storage devices, buses, input/output ports, and networking equipment. The physical hardware may also support specialized instructions such as, for example, SGX instructions, TPM instructions or the like.

The enclave 512 of the present disclosure may be used to control the data flowing into or out of a computer system and/or may perform authorization logic for a customer of a computing resource service provider without confidential data, such as unencrypted passwords or decryption keys, being made available to the computing resource service provider. Entities outside of the enclave 512, including the operating system, other applications and/or users, may not access the data stored in the enclave 512, applications 510 processing within the enclave 512 so long as such data resides within the enclave 512. In some embodiments, the data and application 510 code may be provided to the enclave 512 in encrypted form. In some embodiments, data and/or results of the processing of applications 510 may be output from the enclave 512 in encrypted form. The enclave 512 may receive stored data, for example, from a computer system, process the data according to a particular request from an entity, such as a user, customer, service or application, utilizing executable instructions running within the enclave 512. The stored data may be received in encrypted form, and the processing may include decrypting the stored data using a decryption key held within the enclave 512. Instructions executed within the enclave 512 by a processor may determine whether to provide the data or a subset of the data to the requestor and, based on the determination, may or may not transform the data into another form before providing the data to the requestor. The transformation of the data may entail encrypting the data with the same key as it may have been encrypted with before the enclave 512 received it, encrypting or re-encrypting with a different key, and/or some other transformation of the data, such as censored (e.g., redacted) portions of the data.

In some embodiments, a customer may provide an enclave 512 of the present disclosure with data to be stored in a data store, such as a data store on the data server of the data storage service. In some of these embodiments, the customer may request that the enclave 512 encrypt the data before storing the data. In some of these embodiments usable in combination with other embodiments, instructions executed within the enclave 512 by a processor may encrypt the data by default before storing the data. In a variation of such an embodiment, the customer may ensure that the data is encrypted by the enclave 512 by specifying, for example through an application programming interface call, that the data should pass through an enclave 512 configured for encrypting the data in this manner before being stored to the data store. In another variation of said embodiments, instructions executed within the enclave 512 by a processor may encrypt data by default unless the customer specifies that the data not be encrypted before storing in the data store.

In some embodiments, the customer may have a private key for decrypting stored data in a data store of a data storage service, and in such cases the enclave 512 passes the encrypted data to the customer. In other embodiments, the enclave 512 has the private key and reads from the data store must pass through the enclave 512 for decryption, and, in some embodiments, re-encryption. In some embodiments, both the customer and the enclave 512 may have the private key and the customer may request the cypher text from the data storage service (i.e., request to read the data directly) in order to verify that data is indeed being encrypted and that the key is valid (the same as the enclave 512), by decrypting the cypher text using the private key.

Note that, unless otherwise specified, expressions regarding executable instructions (also referred to as code, applications, agents, etc.) performing operations that instructions do not ordinarily perform unaided (e.g., transmission of data, calculations, and the like) denote that the instructions are being executed by a machine, thereby causing the machine to perform the specified operations.

Figure 6:
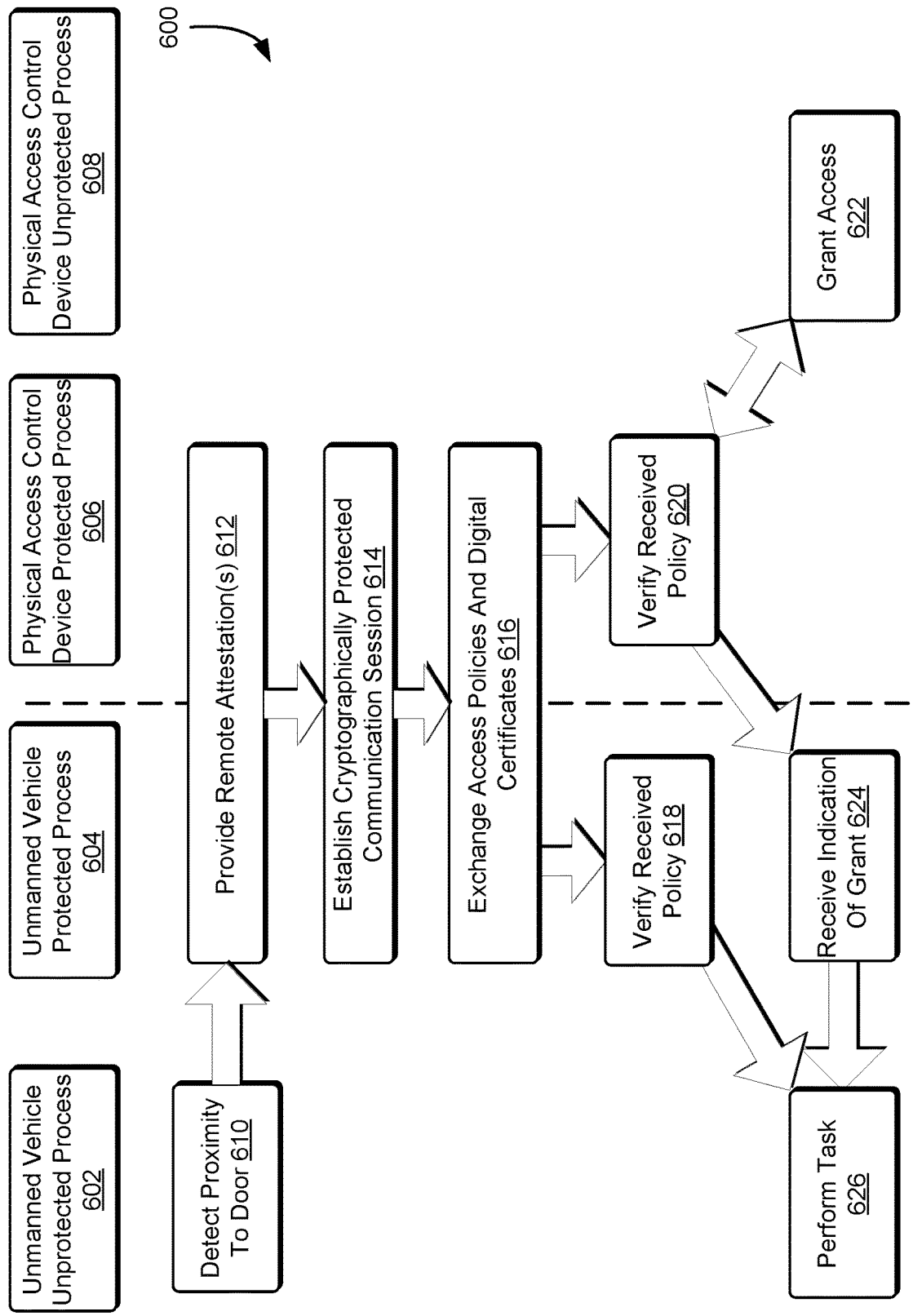
FIG. 6 shows a diagram illustrative an example of an unmanned vehicle and a physical access control device coordinating authentication and authorization processes.

FIG. 6 is a simplified block diagram 600 illustrating how an unmanned vehicle and a physical access control device may perform authentication and authorization processes so as to enable the unmanned vehicle to perform a task such as delivering a package or payload, or pick up a package for delivery to another location.

In some embodiments, an unmanned vehicle such as those described above in connection with FIG. 3 may have an on-board computer system. One or more processors of the on-board computer system may support enclave functionality. As illustrated in the diagram 600, some processes (e.g., the process 602 shown in FIG. 6) may be executed outside of the enclave. In other words, the computing environment outside of the enclave may not have access to data and code within the enclave. The unmanned vehicle may also have one or more enclaves such as the enclave 604 shown in FIG. 6. As discussed elsewhere, application code and data within a protected execution environment (e.g., an enclave) are protected from entities outside the protected execution environment.

Similarly, a physical access control device such as those described above in connection with FIG. 4 may have a processor that supports execution of instructions in an enclave 606 as well as outside of a protected computing environment. More generally, processes 608 running outside of the enclave 606 may include other enclaves or processes running in an unprotected computing environment (e.g., outside of any enclave). Thus, if the enclave 606 running on one or more cores of a processor of the physical access control device stores sensitive data, such as access policies that includes address or GPS coordinates of delivery locations received from the unmanned vehicle, other processes running on the physical access control device computer system—including processes with higher security privileges and even the operating system may not have access to the sensitive data.

In some embodiments, a process 602 outside of an enclave 604 may execute navigation instructions that direct an unmanned vehicle to a particular destination. The destination may be specified in access policies that the unmanned vehicle received from a computing resource service provider, such as in the manner described above in connection with FIG. 2. The unmanned vehicle may propel itself to the destination, in some cases in conjunction with other mode of transportation—for example, an unmanned vehicle may be carried in a larger vessel for a portion of the journey to a destination and then complete the rest of the destination on its own. Such an example may arise where a truck or carrier drone is used to transport multiple unmanned vehicles to a neighborhood and dispatches the multiple unmanned vehicles to make multiple deliveries in parallel. As a second example, an unmanned vehicle may leverage existing infrastructure for part of the journey, such as by utilizing public transportation (e.g., a bus, train, or lightrail).

The process 602 operating outside of the protected execution environment may detect 610 proximity to a physical access control device. The detection may be performed using a combination of sensors. For example, proximity detection may be a two-step process where the unmanned vehicle activates a secondary sensor after using a first sensor (e.g., a GPS receiver) to determine that communication with a particular physical access control device should be possible using short-range communication. A secondary sensor may be activated upon reaching a predetermined location (e.g., encoded as a street address or GPS coordinates) and the sensor may be used to detect whether communication with the physical access control device is possible. Short-range communication channels such as WiFi, Bluetooth, and the like may be used to establish a communication session between the unmanned vehicle and the physical access control device.

Upon detecting 610 proximity to the physical access control device, such as by sending an IP-based message to a physical access control device and receiving a response, the unmanned vehicle may execute authentication and authorization processes in an enclave. In some embodiments, a negotiation agent running within an enclave may provide 612 a remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data. In some embodiments, one or more of the resident cryptographic keys within the enclave of a processor may be shared in common with enclaves of another processor. In some embodiments, the cryptographic keys resident within enclaves may be stored and/or accessible by other processors that are manufactured by the same entity, organization, joint initiative, or consortium. For example, one or more cryptographic key that are used to digitally sign and/or encrypt data output from the enclave 604 of the unmanned vehicle may also be accessible from within the enclave 606 of the physical access control device (e.g., the enclave of the physical access control device has a copy of the cryptographic key that the enclave 604 of the unmanned vehicle uses to digitally sign and/or encrypt the data output).

It should be noted that while FIG. 6 illustrates an example in which an unprotected process to detect 610 proximity to the door, such instructions may be executed in a second protected execution environment separate from the first protected execution environment. For example, in some cases, a GPS receiver may have a protected execution environment that is used to detect proximity to the physical access control device and provide an indication to a negotiation agent to initiate a handshake process with the physical access control device. In such cases, the GPS receiver may provide an indication that the physical access device is nearby to the enclave 604 and the enclave 604 may first verify an attestation that the indication was generated by the protected execution environment associated with the GPS receiver.

In some embodiments, the physical access control device may receive the remote attestation from the enclave 604 of the unmanned vehicle—for example, the remote attestation may be encrypted and/or digitally signed using the cryptographic key resident within the enclave 604 and transmitted (e.g., using a network interface which may or may not be running within the enclave 604) to the physical access control device. The physical access control device may, in a similar manner, utilize a network interface to receive an encrypted and/or digitally signed remote attestation and, within the enclave of the physical access control device 606, verify the remote attestation by using its resident cryptographic key to decrypt an encrypted attestation and verify the decrypted contents, verify a digital signature by generating a digital signature over the received message and determining the generated and received digital signatures match, and more. As part of a mutual authentication process, the physical access control device may provide a remote attestation to the unmanned vehicle in the same or substantially similar manner described above such that the unmanned vehicle's enclave 604 can verify the characteristics of the enclave 604.

After one or more mutual attestations are provided (e.g., by the enclave of the unmanned vehicle to the enclave of the physical access control device or vice versa), the enclave 604 of the unmanned vehicle and the enclave of the physical access control device 606 may exchange cryptographic public keys. The public keys may be exchanged as part of a handshake process to establish 614 a cryptographically protected communication session, such as a transport layer security (TLS) handshake. The cryptographic public keys may be in accordance with various asymmetric cryptography algorithms such as: RSA; digital signature algorithm (DSA); elliptic curve Diffie-Hellman (ECDH); elliptic curve digital signature algorithm (ECDSA); Diffie-Hellman (DH); and more. It should further be noted that the key exchange and/or establishment of a cryptographically protected communication session may occur before and concurrently with the providing of the remote attestations shown in FIG. 6. In some embodiments, a remote attestation may be provided and verified as part of a handshake process for example, as part of exchanging public keys, each party may digitally sign its own public key using a cryptographic key resident to the enclave and the counterparty may receive the public key and use the cryptographic key resident to its enclave to verify the digital signature.

After establishing a cryptographically protected communication session, the parties may exchange 616 access policies such as those described above in connection with FIGS. 1 and 2. For example, the enclave 604 of the unmanned vehicle may provide to the enclave 606 of the physical access control device an access policy that includes a list of street addresses or GPS coordinates that the unmanned vehicle is performing deliveries for. Conversely, the enclave 606 of the physical access control device may provide to the enclave 604 of the unmanned vehicle a list of computing entities that it expects to receive deliveries from. The access policies may, as discussed above, include expirations, associated tasks, conditions of entries, and more. In some embodiments, it may be the case that one or both parties does not have and/or transmit policies to the counterparty. In some cases, the access policies are digitally signed such that the counterparty may verify authenticity of the access policies using cryptographic algorithms, such as in the manner described elsewhere in this disclosure.

Upon receiving one or more access policies, the enclave 604 of the unmanned vehicle may verify 618 both the digital signature associated with the received access policies and the contents of the received access policies. In some embodiments, verifying the contents of the received access policies may include determining that the access policies that the physical access control device grants the unmanned vehicle are sufficient for performing a particular task such as delivery of a package or pickup of a package. Likewise, enclave of the physical access control device may verify 620 both the digital signature associated with the received access policies and contents of the received access policies. For example, the enclave 606 of the physical access control device may verify that the access policies it received from the unmanned vehicle have not expired and that the task that the unmanned vehicle is performing is permitted—for example, the physical access control device may receive an access policy that indicates a package is being delivered to a particular individual at a particular suite of an apartment building. The physical access control device may determine that the particular individual no longer resides there (e.g., has moved away) and deny entry to the unmanned vehicle. Alternatively, if the delivery recipient is a resident, then the physical access control device may provide an indication that the unmanned vehicle should be granted access. From a process 608 running in an unprotected execution space, access may be granted 622, such as by opening or unlocking a door, removing a physical barrier, and more. An indication that access has been granted may be provided to the enclave 606 of the physical access control device which may also be provided to the enclave 604 of the unmanned vehicle, for example, over a cryptographically protected communication session.

As discussed elsewhere, the unprotected process 608 may, in some embodiments, instead be a second protected execution environment separate from the enclave 606 that is used as part of the authentication and authorization processes described above. In some cases, the second protected execution environment may be associated with physical access controls. In some cases, the enclave 606 may provide an indication that that access to a physical space should be granted (e.g., to a second protected execution environment associated with physical access controls). The indication may include information that is usable to verify that the enclave 606 provided the indication, such as a digital signature that is cryptographically verifiable using a cryptographic public key that is available to components outside of the protected execution environment of the enclave 606.

In some embodiments, the enclave 604 of the unmanned vehicle receives 624 an indication that access has been granted. The indication may be made via a cryptographically protected communication session. In response to receiving the indication that access has been granted, the unmanned vehicle may perform 626 a task such as delivering a package that may be done at least in part in by executing instructions from an unprotected execution environment.

Figure 7:
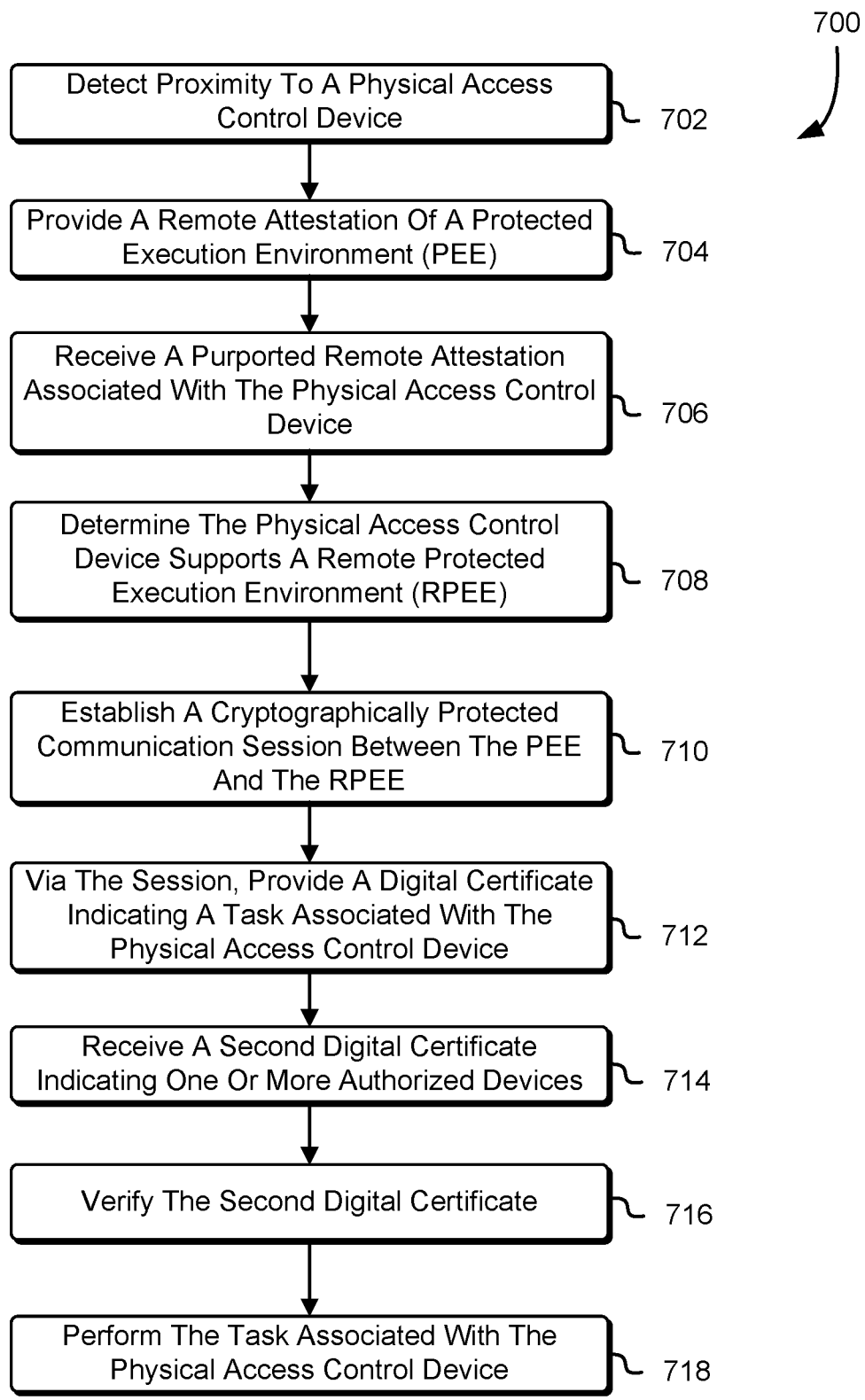
FIG. 7 shows a diagram illustrating a process for performing authentication and authorization processes in connection with performing a task such as delivering a package.

FIG. 7 shows a diagram illustrating a process 700 for performing device-to-device authentication and authorization processes. The process may be performed by any suitable apparatus, such as an unmanned vehicle described above in connection with FIGS. 1-3. In some embodiments, the process 700 may be performed by an unmanned vehicle communicating with a physical access control device via network interface. More generally, the process 700 may be performed by a computing device that supports one or more processors running a negotiation agent in a protected execution environment such that the protected execution environment provides functionality for remote attestation as to a state of the protected execution environment and furthermore has a root of trust in common with a counterparty device (e.g., a physical access control device). For example, the process 700 may be performed by a smartphone, personal digital assistant (PDA), and other types of handheld or wearable computing devices. Data and code (e.g., executable instructions) within a protected execution environment may be protected such that, if exported, the data and/or code may be cryptographically protected, such as by being encrypted and/or digitally signed using a cryptographic key resident to the protected execution environment and not accessible to processes and entities outside of the protected execution environment.

The system may detect 702 proximity to a physical access control device such as those described elsewhere in this disclosure, such as in connection with FIG. 4. The system may support a protected execution environment such as an enclave. A process operating outside of the protected execution environment may detect proximity to a physical access control device. The detection may be performed using a combination of sensors. For example, proximity detection may be a two-step process where the system activates a secondary sensor after using a first sensor (e.g., a GPS receiver) to determine that communication with a particular physical access control device should be possible using short-range communication. A secondary sensor may be activated upon reaching a predetermined location (e.g., encoded as a street address or GPS coordinates) and the sensor may be used to detect whether communication with the physical access control device is possible. Short-range communication channels such as WiFi, Bluetooth, and the like may be used to establish a communication session between the system and the physical access control device. While communications with a physical access control device are discussed in connection with the process 700, the process 700 may be performed in conjunction with other types of computing devices that support protected execution environments. For example, the process 700 may be performed by a first unmanned vehicle that performs a task of handing off a package to a second unmanned vehicle (e.g., the second unmanned vehicle may be suitable for long-range transportation whereas the first unmanned vehicle may be suitable for short-range transportation and/or deliveries).

Upon detecting the physical access control device, the system may provide 704 a remote attestation of the trusted execution environment to the physical access control device. In some embodiments, the system and/or the counterparty (e.g., the physical access control device) may attempt to perform an authentication and/or authorization process with a centralized server (e.g., a computing resource service provider or identity and access management service as described elsewhere in this disclosure) and detect that it is not possible to perform the process or processes, perhaps because it was not possible to establish a connection with the centralized server. For example, the system may be an unmanned vehicle that is attempting to perform a delivery in a location that has poor Internet connectivity such as an underground compound where wireless connectivity may be limited. In some embodiments, one or more steps of the process 700 may be performed in response to determining that a connection attempt to a centralized server failed.

In some embodiments, a characteristic of a protected execution environment such as an enclave is an ability to provide remote attestation as to the state of the protected execution environment. For example, the protected execution environment may have a set of functions that, when executed by a processor, provide a measurement indicating the current state of executable code and/or data within the protected execution environment. Another characteristic of a protected execution environment is that it has a root of trust separate and protected from outside entities. That is, the protected execution environment may have cryptographic keys resident within the protected execution environment for digitally signing data output from the enclave, and, by verifying the digital signature, applications external to the protected execution environment may be configured to trust the output data. In some embodiments, a remote attestation may assert that a system (such as the system performing the process 700 described in connection with FIG. 7) supports a protected execution environment, supports running a negotiation agent (e.g., as described in connection with FIG. 6), or both. The remote attestation may be digitally signed and/or encrypted using a cryptographic key resident to the protected execution environment. The resident cryptographic key may also be accessible by other protected execution environments, such as a protected execution environment running on the physical access control device.

The system may receive 706, from the physical access control device, a purported remote attestation. The purported remote attestation may include information that indicates that the physical access control device supports a protected execution environment such as Intel® Software Guard eXtensions (SGX). The purported remote attestation may be encrypted and/or digitally signed by a cryptographic key. The system may use a cryptographic key resident to the trusted execution environment to cryptographically verify that the purported remote attestation is what it claims to be. The system may use the purported remote attestation to determine 708 that the physical access control device supports a remote protected execution environment. For example, if the purported remote attestation is encrypted, the system may perform a decryption operation and use the decrypted output to verify that the physical access control device supports a remote protected execution environment. In this context, a remote protected execution environment may refer to a protected execution environment that is outside of the processor die from which the system's protected execution environment on which the system's negotiation agent may be executed on. As a second example, if the purported remote attestation is digitally signed, the system may use a cryptographic key resident to the enclave on which a negotiation agent is running to generate a digital signature over a message that asserts the counterparty supports a remote enclave and compare the generated digital signature with a digital signature received from the remote counterparty.

In some embodiments, the system 700 may first determine that a remote counterparty supports a remote protected execution environment and then establish 710 a cryptographically protected communication session between the local protected execution environment (e.g., an enclave running on the system) and the remote protected execution environment (e.g., an enclave running on the counterparty's computing system). A cryptographically protected communication session may be a transport layer security (TLS) session. In some embodiments, the system and the remote counterparty may exchange public keys as part of a handshake process. The cryptographic public keys may be in accordance with various asymmetric cryptography algorithms such as: RSA; digital signature algorithm (DSA); elliptic curve Diffie-Hellman (ECDH); elliptic curve digital signature algorithm (ECDSA); Diffie-Hellman (DH); and more. In some embodiments, the cryptographically protected communication session may be used to provide cryptographic assurances of confidentiality, integrity, authenticity, and various combinations thereof. In some embodiments, a session key (e.g., a symmetric cryptographic key) may be used to encrypt communications over an established cryptographically protected communication session. The session key may be sensitive data stored within the enclave of the system and the counterparty's enclave such that the session key is not exportable from the enclaves in an unobfuscated format (e.g., the session key is encrypted using a cryptographic key resident to an enclave).

After establishing a cryptographically protected communication session (e.g., a TLS session), an enclave of the system may provide 712, via the cryptographically protected communication session, access policies that indicate a list of location including tasks to perform at the addresses, such as delivering and/or picking up packages at a certain street addresses or GPS coordinates. The access policies may be digitally signed by an entity that is trusted by the counterparty, such as an identity access and management service for which the counterparty possesses a public key for. The access policies may be transmitted in any suitable manner, such as in accordance with a TLS record protocol.

In some embodiments, the system may receive 714 a digital certificate from a remote counterparty (e.g., the physical access control device) that includes a list of access policies that grants one or more devices access. The digital certificate may be received via a cryptographically protected communication session and may be cryptographically verifiable using a cryptographic key resident to the system's enclave, such as by using techniques described elsewhere in this disclosure. An enclave of the system may receive access policies for a list of devices that are permitted to perform certain tasks. As an example, an enclave of an unmanned vehicle may receive, from an enclave of a physical access control device, access policies corresponding to a list of devices to grant access to (e.g., a list of devices that the physical access control device expects to make deliveries during a business day) and a digital signature over the access policies. The system may verify 716 that the digital signature is authentic using techniques described elsewhere in this disclosure, and verify that the system is authorized to perform actions in connection with a task such as the delivery of a package or picking up a package. For example, as part of picking up a package, the system may check whether the system or another system is authorized to debit a payment in connection with picking up the package and delivering it to a destination.

Finally, upon completing an authentication process (e.g., determining the remote counterparty supports a protected execution environment and authenticating the identity of the counterparty via a public key certificate) and an authorization party (e.g., determining the remote counterparty authorizes the system to perform a particular task), the system may perform 718 a task which may require access to a physical space whose access is controlled by a physical access control device. The physical access control device may grant access to a physical space and provide an indication to the system. In response to receiving the indication, the system may perform the task, which may include performing instructions in an unprotected execution environment (e.g., in a process or thread outside of the enclave).

The ordering of the process 700 steps is merely illustrative. While the process 700 shown in FIG. 7 illustrates an example process in which the system provides 704 a remote attestation and then receive 706 a purported remote attestation, the steps need not be in this sequence. For example, the system may receive the purported attestation prior to providing the remote attestation. More generally, these steps (as well as other steps of the process 700) may be performed concurrently, in various sequential ordering, and/or in a nondeterministic manner (e.g., the order of steps relative to each other may differ based on other factors of the computing environment). For example, the cryptographically protected communication session may be established prior to receiving the purported remote attestation. In such an embodiment, the cryptographically protected communication session may be terminated if the system is not able to use the purported remote attestation to determine that the counterparty of the cryptographically protected communication session supports a remote protected execution environment.

Figure 8:
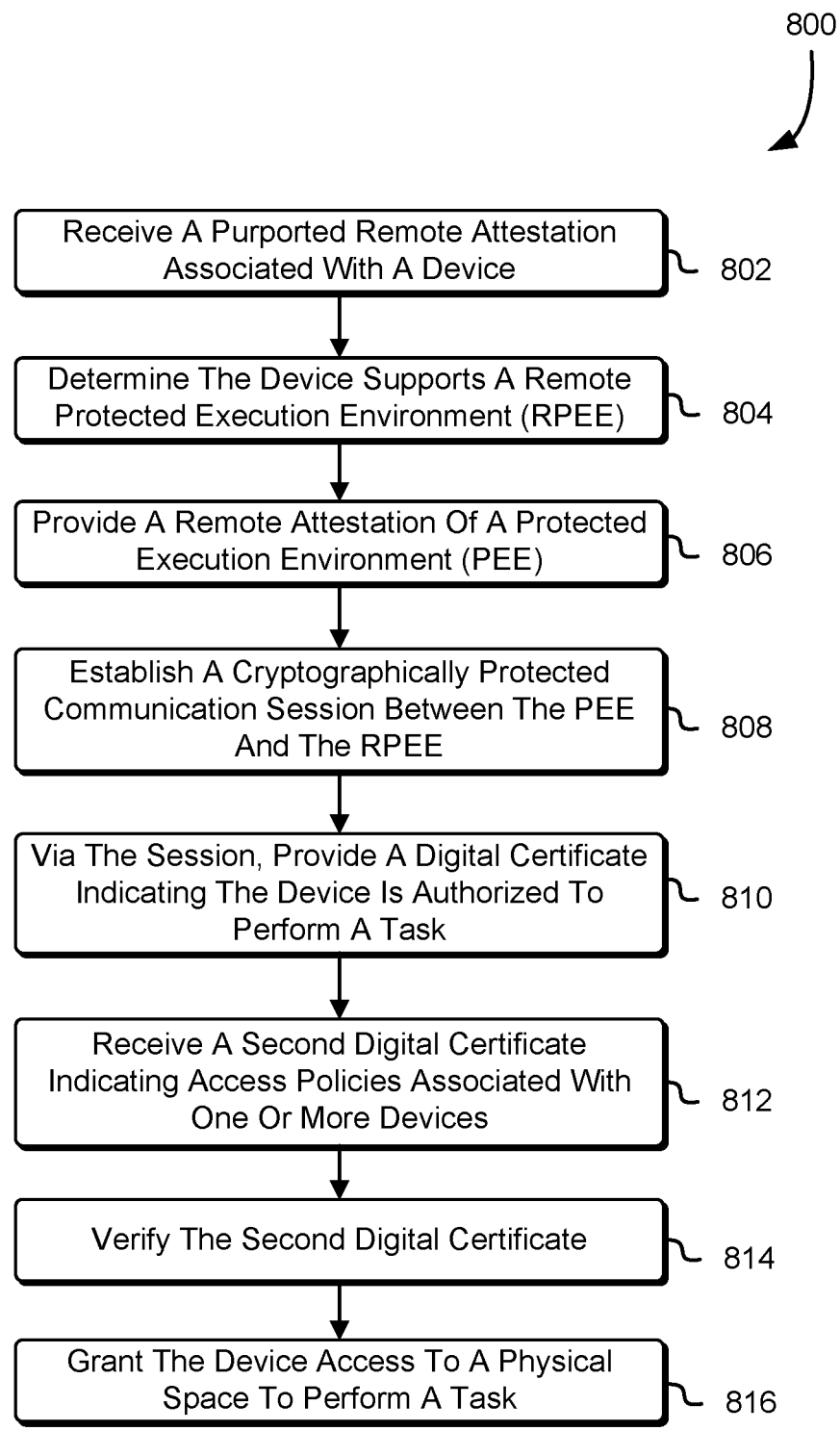
FIG. 8 shows a diagram illustrating a process for authenticating and authorizing a device in connection with granting access to a physical space to perform a task.

FIG. 8 shows a diagram illustrating a process 800 for performing device-to-device authentication and authorization processes. The process may be performed by any suitable apparatus, such as a physical access control device described above in connection with FIGS. 1, 2, and 4. In some embodiments, the process 800 may be performed by a physical access control device communicating with a computing device (e.g., an unmanned vehicle described in connection with FIG. 3) via network interface. More generally, the process 800 may be performed by a computing device that supports one or more processors running a negotiation agent in a protected execution environment such that the protected execution environment provides functionality for remote attestation as to a state of the protected execution environment and furthermore has a root of trust in common with a counterparty device (e.g., a physical access control device). Data and code (e.g., executable instructions) within a protected execution environment may be protected such that, if exported, the data and/or code may be cryptographically protected, such as by being encrypted and/or digitally signed using a cryptographic key resident to the protected execution environment and not accessible to processes and entities outside of the protected execution environment.

The apparatus may receive 802 a purported remote attestation associated with a remote device such as an unmanned vehicle described in connection with FIG. 3. The purported remote attestation may include information that indicates that the physical access control device supports a protected execution environment such as Intel® Software Guard eXtensions (SGX). The purported remote attestation may be encrypted and/or digitally signed by a cryptographic key. The apparatus may use a cryptographic key resident to the trusted execution environment to cryptographically verify that the purported remote attestation is what it claims to be. The apparatus may use the purported remote attestation to determine 804 that the counterparty device supports a remote protected execution environment, for example, in the same or similar manner as described above in connection with the process described in FIG. 7.

In some embodiments, the apparatus uses a cryptographic key resident to an enclave to verify that the purported remote attestation is authentic and that the counterparty device supports a remote protected execution environment. Upon determining the counterparty supports a remote protected execution environment, the apparatus may provide 806 a remote attestation that it supports a protected execution environment. The remote attestation may be digitally signed using a cryptographic key resident to an enclave, such as in the manner described above in connection with FIG. 7.

A cryptographically protected communication session such as a TLS session may be established 808 between the enclaves of the apparatus and the remote device, such as in the manner described above in connection with FIG. 7, and via the session, the apparatus may provide 810 a digital certificate of access policies that includes a list of devices that may be granted access to perform various tasks. The grant of access may refer to granting access to a physical space that is controlled by the apparatus (e.g., via a controllable door or gate). Various devices may be granted access to various physical spaces to perform various tasks.

The apparatus may receive 812 a digital certificate from the device (e.g., an unmanned vehicle) that indicates one or more devices. The access policies may indicate a list of devices that the apparatus may interact with in coordinating the delivery and/or picking up of one or more packages from multiple locations such as multiple residences, commercial addresses, warehouses, and more. The access policies may be digitally signed by the private key of an entity such as a computing resource service provider that is trusted by the apparatus. The apparatus may have access to the corresponding public key of the trusted entity, for example, included in a trusted root certificate. The apparatus may use the public key to verify 814 the digital certificate is authentic and verify that the apparatus is identified in the access policies. The apparatus may grant 816 access to a physical space, thereby enabling the device to perform a task. Access may be granted at least in part through the use of an unprotected execution environment, which may be used to open or unlock a door or gate.

Figure 9:
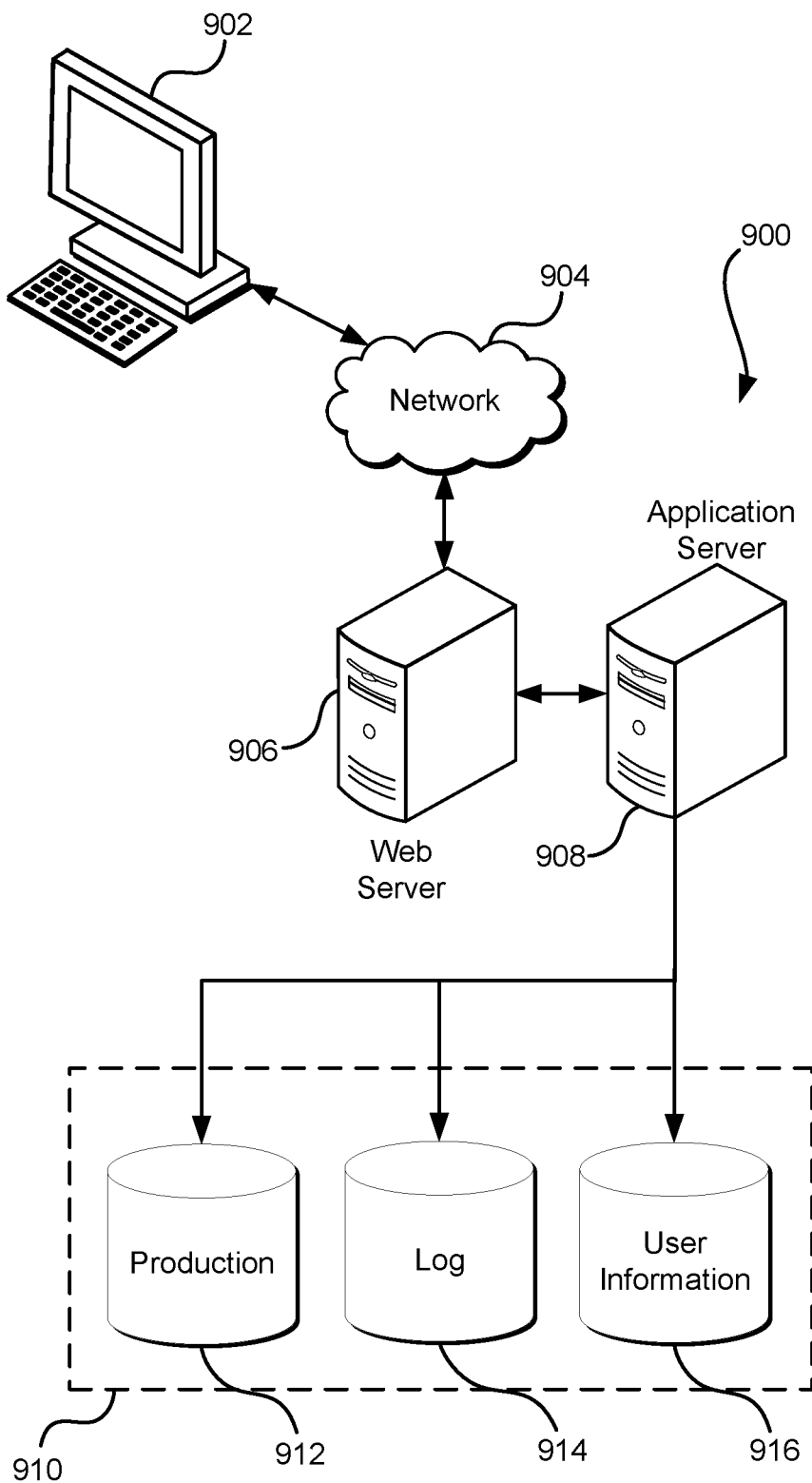
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned vehicle, comprising:
   one or more processors; and
   memory that stores instructions that, as a result of execution by the one or more processors, cause the one or more processors to:
      execute a negotiation agent in a protected execution environment, wherein the protected execution environment has a root of trust in common with a physical access control device and prevents unauthorized access to the negotiation agent;
      provide, to the physical access control device, an attestation as to a state of the protected execution environment;
      obtain a purported attestation associated with the physical access control device;
      use the root of trust to verify that the purported attestation is authentic and corresponds to the physical access control device;
      provide, to the physical access control device, a first digital certificate associated with an access policy that indicates a task associated with the physical access control device, the first digital certificate to allow the physical access control device to determine an indication that the unmanned vehicle is authorized to enter a physical space controlled by the physical access control device;
      obtain a second digital certificate associated with the physical access control device including identity information of the physical access control device;
      verify the second digital certificate is authentic based at least in part on a shared secret between the unmanned vehicle and the physical access control device;
      obtain the indication of a grant of access to the physical space controlled by the physical access control device; and
      access the physical space in response to the indication using a physical access device opened by the physical access control device in response to the verification of the second digital certificate.

2. The unmanned vehicle of claim 1, wherein the attestation as to the state of the protected execution environment comprises an indication of code running in the protected execution environment.

3. The unmanned vehicle of claim 1, wherein:
   the memory that stores instructions that, if as a result of execution by the one or more processors, further causes the one or more processors to detect physical proximity to the physical access control device; and the negotiation agent is further configured to provide the attestation in response to detecting physical proximity to the access control device.

4. The unmanned vehicle of claim 1, wherein the negotiation agent is further configured to:
obtain the first digital certificate in accordance with an authenticated encryption algorithm; and
decrypt and verify authenticity of the first digital certificate using a cryptographic key, wherein the cryptographic key is unavailable to instructions executed outside of the protected execution environment.

5. The unmanned vehicle of claim 1, wherein the memory that stores instructions that, if as a result of execution by the one or more processors, further cause the one or more processors to perform the task associated with the physical access control device based at least in part on successfully verifying the second digital certificate is authentic.

6. A physical access control device, comprising:
one or more processors; and
memory that stores computer-executable instructions that, as a result of execution, cause the one or more processors to:
execute a negotiation agent in a protected execution environment, wherein the protected execution environment has a root of trust in common with a computing device of an unmanned vehicle and prevents unauthorized access to the negotiation agent;
provide, to the computing device, an attestation as to a state of the protected execution environment;
verify a purported attestation associated with the computing device is authentic using at least the root of trust;
provide a first digital certificate including a first access policy associated with the computing device to allow the unmanned vehicle to determine that the unmanned vehicle is authorized to enter a space controlled by the physical access control device;
verify a second digital certificate associated with the computing device and including a second access policy associated with the physical access control device is authentic using at least a shared secret; and
grant the unmanned vehicle physical access to the space in response to the verification of the second digital certificate by at least causing a physical access device impeding access to the space to allow the unmanned vehicle to enter the space.

7. The physical access control device of claim 6, wherein:
the protected execution environment is further configured to provide an indication to an unprotected execution environment to provide physical access to the space;
the memory that stores the computer-executable instructions, that, as a result of execution, further cause the one or more processors to, in the unprotected execution environment, verify that indication to provide access to the space is from the protected execution environment; and
the instructions to grant physical access to the space by at least causing the physical access device impeding access to the space to allow the unmanned vehicle to enter the space include instructions that, as a result of execution, cause the one or more processors to use the unprotected execution environment to execute instructions that are used at least in part to unlock the physical access device.

8. The physical access control device of claim 6, wherein the protected execution environment is an enclave.

9. The physical access control device of claim 6, wherein authenticity of both the first digital certificate and the second digital certificate can be cryptographically verified using a cryptographic public key included in a third digital certificate, wherein authenticity of the cryptographic public key is verifiable using a chain of trust that includes a trusted root certificate.

10. The physical access control device of claim 6, wherein the protected execution environment is further configured to establish a transport layer security (TLS) session based at least in part on verifying the purported attestation is authentic.

11. The physical access control device of claim 6, wherein the attestation is digitally signed by a cryptographic key resident within the protected execution environment and inaccessible to application code running outside of the protected execution environment.

12. The physical access control device of claim 11, wherein the application code running outside of the protected execution environment is associated with an operating system that is used at least in part to run the protected execution environment.

13. The physical access control device of claim 6, wherein the second digital certificate is associated with a plurality of devices having respective street addresses or global positioning satellite (GPS) coordinates.

14. A computer-implemented method, comprising:
establishing a protected execution environment, wherein the protected execution environment has a root of trust in common with a computing device of an unmanned vehicle and prevents unauthorized access to the protected execution environment;
providing, to the computing device, an attestation as to a state of the protected execution environment;
obtaining a purported attestation associated with the computing device;
verifying the purported attestation is authentic using at least the root of trust;
obtaining a first digital certificate associated with a plurality of access policies;
verifying the first digital certificate from the computing device is authentic based at least in part on a shared secret in common with the computing device;
providing, to the computing device, a second digital certificate to allow the unmanned vehicle to determine whether the unmanned vehicle is authorized to enter a space, wherein the second digital certificate is cryptographically verifiable using at least the shared secret, the second digital certificate;
providing an instruction to cause a physical access device impeding access to the space to grant physical access to the space in response to verifying the first digital certificate is authentic and contingent upon an access policy of the plurality being associated with the space and being authorized; and
granting physical access to the space based on the instruction.

15. The computer-implemented method of claim 14, further comprising, within the protected execution environment, establishing a transport layer security (TLS) session based at least in part on verifying the purported attestation is authentic.

16. The computer-implemented method of claim 15, wherein establishing the TLS session comprises exchanging elliptic curve Diffie-Hellman (ECDH) cryptographic keys with the computing device.

17. The computer-implemented method of claim 14, wherein protected execution environment is established in response to a failure to connect to an identity and access management service.

18. The computer-implemented method of claim 14, wherein the protected execution environment supports an instruction set in accordance with software guard extensions (SGX).

19. The computer-implemented method of claim 14, wherein granting physical access to the space is performed at least in part outside of the protected execution environment.

20. The unmanned vehicle of claim 1, wherein:
the unmanned vehicle is a first unmanned vehicle.
the physical access control device is a component of a second unmanned vehicle,
the physical space includes a cargo bay of the second unmanned vehicle; and
the memory that stores instructions that, as a result of execution by the one or more processors, further causes the one or more processors to load a payload from the first unmanned vehicle to the cargo bay of the second unmanned vehicle.

* * * * *